(12) United States Patent
Muldoon

(10) Patent No.: US 7,602,096 B2
(45) Date of Patent: Oct. 13, 2009

(54) MAGNETIC GAS ENGINE AND METHOD OF EXTRACTING WORK

(75) Inventor: Patrick Craig Muldoon, 1071 Sinking Creek Rd., Hoges Chapel, VA (US) 24136

(73) Assignee: Patrick Craig Muldoon, Hoges Chapel, VA (US)

( * ) Notice: Subject to any disclaimer, the term of this patent is extended or adjusted under 35 U.S.C. 154(b) by 643 days.

(21) Appl. No.: 11/362,928

(22) Filed: Feb. 28, 2006

(65) Prior Publication Data

US 2006/0248895 A1 Nov. 9, 2006

Related U.S. Application Data

(60) Provisional application No. 60/676,946, filed on May 3, 2005.

(51) Int. Cl.
*H02K 1/22* (2006.01)
(52) U.S. Cl. ...................................................... 310/267
(58) Field of Classification Search ................. 310/267, 310/261, 264, 11
See application file for complete search history.

(56) References Cited

U.S. PATENT DOCUMENTS 4,069,665 A * 1/1978 Bolasny ........................ 60/275
5,950,753 A * 9/1999 Muldoon et al. ........... 180/68.1

* cited by examiner

*Primary Examiner*—Javaid Nasri

(57) ABSTRACT

The present subject matter overcomes the deficiencies in the prior art by introducing or generating charged particles in an air stream and manipulating the air stream with magnetic fields operating on the charged particles. Embodiments of the present subject matter compress the air stream by accelerating charged particles with a moving magnetic field, where the magnetic field has a velocity perpendicular to its flux lines. The increased velocity of the charged particles increases the statistical mean particle velocity and thereby increases the pressure in the air stream. The compressed air stream is then heated and expanded through a second magnetic field. The expansion of the air stream substantially increases the velocity of the air stream and the charged particles therein. The interaction of the high velocity charged particles and the magnetic field imparts a force perpendicular to the flux lines, this force powers the movement of the magnetic field and can also be extracted in the form of mechanical work.

20 Claims, 14 Drawing Sheets

MAGNETIC GAS ENGINE AND METHOD OF EXTRACTING WORK

RELATED APPLICATIONS

This application claims priority benefit of U.S. Provisional Application 60/676,946 entitled "Magnetic Gas Engine and Method of Extracting Work" filed May 3, 2005, the entirety of which is incorporated herein by reference.

BACKGROUND

In order to facilitate the disclosure to the present subject matter, a brief discussion of thermodynamics of jet engines, magnetism and particle dynamics follow.

Fluid propulsion devices achieve thrust by imparting momentum to a fluid called the propellant. An air-breathing engine, as the name implies, uses the atmosphere for most of its propellant. The gas turbine produces high-temperature gas which may be used either to generate power for a propeller, generator or other mechanical apparatus or to develop thrust directly by expansion and acceleration of the hot gas in a nozzle. In any case, an air breathing engine continuously draws air from the atmosphere, compresses it, adds energy in the form of heat, and then expands it in order to convert the added energy to shaft work or jet kinetic energy. Thus, in addition to acting as propellant, the air acts as the working fluid in a thermodynamic process in which a fraction of the energy is made available for propulsive purposes.

The main sources of energy for air-breathing engines are hydrocarbon fuels; however, other forms of heat energy can equally be applied limited by practicality.

The performance of jet engines may be understood by means of the laws of thermodynamics, however these laws also restrict the performance to certain upper limits which depend strongly on the maximum temperature the engine can withstand.

Fairly general equations for thrust and efficiency of air breathing jet engines can be derived from the momentum and energy laws without the need for detailed consideration of the internal mechanisms of particular engines. Consider, for example, the generalized thrust producing device 100 illustrated in FIG. 1, as observed from a stationary position with respect to the device. In FIG. 1, a control surface 101 is specified which passes through the propellant outlet plane at station 2 and extends far upstream at station 1. The side surfaces of the control volume are parallel to the upstream velocity u and far removed from the thrust device 100. It is assumed for this discussion that the thrust and conditions at all points within the control volume do not vary temporally.

The reaction to the Thrust T transmitted through the structural support 102 is indicated in FIG. 1. In this sense the engine thrust may be defined as the vector summation of all forces on the internal and external surfaces of the engine and nacelle.

The thrust of the generalized thrust producer as it applies to steady flow in the x direction only gives:

$$\Sigma F_x = \int u_x(\rho u \cdot n)dA. \quad (1)$$

With the assumption of reversible external flow, both the pressure and the velocity may be assumed constant over the entire control surface, except over the exhaust area $A_e$ of the engine. If the exhaust velocity $u_e$ is supersonic, the exhaust pressure $p_e$ may differ from the ambient pressure $p_a$. The net pressure force on the control surface is therefore $(p_a - p_e)A_e$. The only other forces acting on this control volume is the reaction to the thrust T. Adding up the forces on the control surface which act in the x-direction results in:

$$\Sigma F_x = (p_a - p_e)A_e + T. \quad (2)$$

Far upstream at station 1 the air which is drawn into the engine crosses the control surface through capture area $A_i$ at a rate $\dot{m}_a$ given by $\dot{m}_a = \rho u A_i$, in which $\rho$ is the ambient density and u is the flight velocity. The mass flux crossing the exhaust area $A_e$ is $m_e = \rho_e u_e A_e$. Taking account of the fuel flow rate $\dot{m}_f$, we have $\dot{m}_e = \dot{m}_a + \dot{m}_f$ and, $$\dot{m}_f = \rho_e u_e A_e - \rho u A_i. \quad (3)$$

Now, considering the requirement of continuity for the control volume as a whole, and assuming that the fuel flow originates from outside, the control volume for steady flow is $$\int \rho u \cdot n dA = 0. \quad (4)$$

which for the present case may be written as:

$$\rho_e u_e A_e + \rho u(A - A_i) + \dot{m}_s - \dot{m}_f - \rho u A = 0 \quad (5)$$

in which A is the cross sectional area of the control volume normal to the velocity u and $\dot{m}_s$ is the mass flow of air through the side surfaces of the control volume. However in a power generation application such as a gas turbine the mass flow of a v may be written as zero.

$$\dot{m}_s = \rho u(A_e - A_i). \quad (6)$$

If the sides of the control volume are sufficiently distant from the thrust producer 100, it may be assumed that this flow crosses the control surfaces with a very small velocity in the y direction and an essentially undisturbed velocity component in the x direction. Thus, the momentum carried out by the control volume with this flow is simply mu and when the components only in the x direction are considered, the right hand side of the equation may be written as:

$$\int u_x \rho(u \cdot n)dA = \dot{m}_e u_e + \dot{m}_a u + \rho u(A - A_i)u - \dot{m}_a u - \rho u(A - A_i)u \quad (7)$$

which is the net outward flux of x-momentum from the control volume 101. Using Equation 6, we may reduce this to:

$$\int u_x \rho(u \cdot n)dA = \dot{m}_e u_e - \dot{m}_a u. \quad (8)$$

When we use Equations 2 and 8, the momentum equation 1 becomes $$T = T = \dot{m}_e u_e + \dot{m}_s u_e + (p_e + p_a)A_e \quad (9)$$

or, defining the fuel-air ration $f = \dot{m}_f / \dot{m}_a$, we have:

$$T = m_e[(1+f)u_e - u] + (p_e - p_a)A_e. \quad (10)$$

The term $(p_e - p_a)A_e$ is non zero only if the exhaust jet is supersonic and the nozzle does not expand the exhaust jet to ambient pressure. Even if it is non zero, it is usually small compared to the momentum-flux term.

It should be borne in mind that in the derivation of Equation 10, the flow external to the engine has been assumed reversible. If this is not so, due to significant boundary layer effects such as separation, the actual force transmitted by the structural support 102 of FIG. 1 could be appreciably less than Equation 10 would predict. For engines which have two distinct exhaust streams, Equation 1 must be applied separately to each stream.

Ramjets

The simplest of all air-breathing engines is the ramjet. As shown schematically in FIG. 2, it consists of a diffuser 201, a combustion chamber 203, and an exhaust nozzle 205. Air enters the diffuser 201 where it is compressed before it is mixed with the fuel and burned in the combustion chamber 203. The hot gases are then expelled through the nozzle 205 by virtue of the pressure rise in the diffuser 201 as the incoming air is decelerated from flight speed to a relatively low velocity within the combustion chamber 203. Consequently, although ramjets can operate at subsonic flight speeds, the increasing pressure rise accompanying higher flight speeds renders the ramjet most suitable for supersonic flight.

Since the combustion chamber requires an inlet Mach (M) number of about 0.2 to 0.3, the pressure rise at supersonic flight speeds can be substantial. For example, for isentropic deceleration from M=3 to M=0.3, the static pressure ratio between ambient and combustion chamber pressures can be around 34. Only a fraction of the isentropic pressure ratio is actually achieved since, especially at high Mach numbers, the stagnation pressure losses associated with shocks are substantial. After compression the air flows past the fuel injectors 211 which spray a stream of fine fuel droplets so that the air and fuel mix as rapidly as possible. The mixture then flows through the combustion chamber 203 which usually contains a flame holder 212 to stabilize the flame. Combustion raises the temperature of the mixture to around 4000° R before the products of combustion expand to high velocity in the nozzle 205. This thrust is actually applied by pressure and shear forces distributed over the surfaces of the engine 200.

In order to understand the performance of the ramjet, it is helpful to perform a thermodynamic analysis of a simplified model. Let us assume that the compression and expansion processes in the engine are reversible and adiabatic, and that the combustion process takes place at constant pressure. These assumptions are not, of course, realistic. In the actual diffuser, there are always irreversibilities due to shocks, mixing, and wall friction. Additionally, it may be noted that, unless the combustion occurs at very low fluid velocity, both static and total pressures will drop, due to heat addition. Departures from isentropic flow in a real nozzle occur due to friction and heat transfer. However, the ideal ramjet is a most useful concept, since its performance is the highest that the laws of thermodynamics will permit, and is the limit which real engines will approach if an engine's irreversibility's can be reduced.

Using the station numbers of FIG. 2, FIG. 3 shows, on a temperature-entropy diagram, the processes air goes through in an ideal ramjet. The compression process takes air from its condition at station (a) isentropically to its stagnation state (02) at station (2). The combustion process is represented by a constant-pressure heat and mass addition process (02) to (04) up to the maximum temperature $T_{04}$. The exit nozzle 205 expands the combustion products isentropically to the ambient pressure (06). (Isentropic expansion demands that exhaust pressure equal ambient pressure). The ideal engine thrust may be obtained from Equation 10 as $$T = \dot{m}_a[(1+f)u_e - u] \quad (11)$$

With isentropic compression and expansion processes, and constant-pressure heat and mass addition, it follows that the stagnation pressure must be constant throughout the engine. Therefore $p_{0a} = p_{06}$.

If variations in fluid properties (R, γ) through the engine are ignored for this ideal case, $$\frac{P_{0a}}{P_a} = \left(1 + \frac{\gamma-1}{2}M^2\right)^{\gamma/(\gamma-1)} \quad (12) \text{ and } (13)$$

-continued
and $$\frac{P_{06}}{P_e} = \left(1 + \frac{\gamma-1}{2}M_e^2\right)^{\gamma/(\gamma-1)}$$

in which M is the flight Mach number and $M_e$ is the Mach number in the plane of the exhaust. Therefore, with the condition $p_e = p_a$, it is clear that $$\frac{P_{0a}}{P_a} = \frac{P_{06}}{P_e} \quad (14)$$

and $$M_e = M_a$$

Thus the exhaust velocity may be determined from $$u_e = \frac{a_e}{a_a}u$$

where a is the speed of sound. Since $a=\sqrt{\gamma RT}$, then $a_e/a_a = \sqrt{T_e/T_a}$. However, for the case $M_e = M_a$, $T_e/T_a = T_{06}/T_{0a}$ and, since $T_{04} = T_{06}$, then:

$$u_e = \sqrt{T_{04}/T_{0a}}\,u. \quad (15)$$

The energy equation applied to the idealized combustion process, neglecting the enthalpy of the incoming fuel, is $$(1+f)h_{04} = h_{02} + fQ_R \quad (16)$$

where f is the fuel-air ratio and $Q_R$ is the heating value of the fuel. If the specific heat is assumed constant, then Equation 16 may be solved for f in the form $$f = \frac{(T_{04}/T_{0a}) - 1}{(Q_R/c_p T_{0a}) - T_{04}/T_{0a}}. \quad (17)$$

Equations 10 and 15 may be combined to give the thrust per unit mass flow of air, $$\frac{T}{\dot{m}_a} = M\sqrt{\gamma R T_a}\left[(1+f)\sqrt{T_{04}/T_a}\left(1 + \frac{\gamma-1}{2}M^2\right)^{-1/2} - 1\right] \quad (18)$$

where f is given by Equation 17. The thrust specific fuel consumption (TSFC) is given by:

$$TSFC = \frac{\dot{m}_f}{T} = \frac{f}{T/\dot{m}_a} \quad (19)$$

with appropriate constants to convert to the desired units, usually pounds (mass) per hour per pound force.

FIG. 4 indicates the thrust specific fuel consumption and the required fuel-air ratio of an ideal ramjet as a function of flight Mach number and peak temperature. It can be seen that for any given temperature there is a maximum flight Mach number at which no fuel may be burned in the air. Conversely, for any given flight Mach number it would appear from the figure that operation at low temperature is advantageous, since it results in lower TSFC. However, as shown in FIG. 5, this means a relatively low thrust per unit airflow rate and hence a larger engine for a given thrust. But the larger the engine, the greater its mass and drag. As a result, maximum speed operation of an aircraft is often based on maximum tolerable temperature. Cruise operation may then employ a lower engine temperature, which engenders both longer engine life and lower specific fuel consumption. The choice of the best engine size and operating temperature for maximum cruise economy requires a careful analysis of the drag and weight penalties associated with larger engines, as well as an analysis of fuel consumption.

Gas Turbine Engines

It has been mentioned that one of the disadvantages of the ramjet is that its pressure ratio depends on the flight Mach number. The Ramjet cannot develop takeoff thrust and, in fact, it does not perform well unless the flight speed is considerably above the speed of sound. One way to overcome this disadvantage is to install a mechanical compressor in the inlet duct, so that even at zero flight speed air could be drawn into the engine, burned, and then expanded through a nozzle. However, this introduces the need for power to drive the compressor. If a turbine is coupled to the compressor and driven by the hot gas passing from the burner on its way to the exhaust nozzle, the ramjet has become a turbojet. The addition of the turbo machinery, however, entirely changes the characteristic performance of the engine.

The internal arrangement of the turbojet is shown schematically in FIG. 6. In flowing through the machine, air undergoes the following processes:

At station (a) from far upstream, where the velocity of the air relative to the engine is the flight velocity, the air is brought to the intake 601, usually with some acceleration or deceleration.

Between stations (1)-(2), the air velocity is decreased as the air is carried to the compressor inlet 604 through the inlet diffuser 603 and ducting system.

Between stations (2)-(3) the air is compressed in a dynamic compressor 605.

Between stations (3)-(4) the air is "heated" by the mixing and burning of fuel in the air in a combustion chamber 607 or burner.

Between stations (4)-(5) the air is expanded through a turbine 609 to obtain power to drive the compressor.

Between stations (5)-(6) the air may or may not be further "heated" by the addition and burning of more fuel in an afterburner 611.

Between stations (6)-(7) the air is accelerated and exhausted through the exhaust nozzle 613 and outlet 615.

The thermodynamic path of the fluid within a turbojet 600 may be conveniently shown on an enthalpy-entropy or temperature-entropy diagram. To gain an understanding of the overall process, it is useful at first to study a highly simplified model. For this reason, let us assume that all components except the burners are reversible and adiabatic, that the burners may be replaced by simple frictionless heaters, and that velocities at stations (2) through (6) are negligible. The T-s diagram for such an engine is shown in FIG. 7 for non-afterburning and afterburning engines, assuming the working fluid to be a perfect gas. In the ideal case the pressure rises from (a) to (1), and still more from (1) to (2) as the air is decelerated relative to the engine. Since the velocity at (2) is assumed zero and the deceleration is isentropic, $p_2$ is the stagnation pressure for states (a), (1), and (2). Also, $T_2$ is the stagnation temperature for these states. The power consumed in compression from (2) to (3) must be supplied through the turbine in expansion from (4) to (5). Hence, if the compressor and turbine mass flow rates are equal, $h_3-h_2=h_4-h_5$, and if the specific heat is constant, the corresponding temperature differences are also equal. In the non-afterburning case, states (5) and (6) are identical and the enthalpy drop from (5) or (6) to (7) is proportional to the square of the exhaust velocity $u_e^2$. In the afterburning case: the air is reheated between (5) and (6). From the shape of the constant-pressure curves it can be seen that $(T_6-T_7)$, and hence the exhaust velocity, will be greater in the afterburning case. The absence of highly stressed material in the after burner allows $T_6$ to be much higher even than $T_4$, so that the increase in exhaust velocity can be on the order of 50%.

Although this is a greatly simplified model, it illustrates the functions of the various components and the relationships between them. It shows clearly that the output or kinetic energy of the exhaust fluid is, in a sense, a remainder after power has been extracted from the fluid to drive the compressor.

An actual engine differs from this ideal model in several respects. First, and most important, no components are actually reversible, although it is usually reasonable to assume them adiabatic. Second, the burners are not simple heaters and the composition of the working fluid will change during the combustion processes. Third, the fluid velocities within the engine are not negligible. If the fluid velocity in the combustor were actually zero (as constant-pressure combustion requires), it would be impossible to have a stable flame, since the flame propagates relative to the fluid at fairly large velocities. There is a fourth difference, in that the turbine and compressor flow rates may not be equal since, on the one hand, fuel is added between the two and, on the other, air may be extracted at various positions for cooling purposes.

FIG. 8 shows an enthalpy-entropy diagram for a real engine with reasonable irreversible effects, and typical temperatures, for a compressor pressure ratio of ten. Afterburning and non-afterburning processes are shown, with the exhaust pressure equal to ambient pressure in both cases.

The process begins with atmospheric air at $h_a$, $p_a$. By virtue of the relative (flight) velocity between the air and the engine, this air has a stagnation enthalpy $h_{oa}$, higher than $h_a$. Further, since no work or heat transfer occurs between (a) and (2), the stagnation enthalpy is constant through station (2). The air is externally decelerated from (a) to (1). For all practical purposes this external deceleration is an isentropic process (unless an external shock occurs), hence state (1) is on an isentrope with state (a) and $p_{01}=p_{0a}$. From (1) to (2) the air is further decelerated, accompanied by an increase in entropy through frictional effects. Note that this results in a decrease in stagnation pressure. From (2) to (3) the air is compressed, again with an increase of entropy due to irreversibilities in the compression process. State $(03)_s$ is defined as that state which would exist if the air could be compressed isentropically to the actual outlet stagnation pressure. State (03) is the actual outlet stagnation state.

From station (3) to station (4) (see FIG. 6), some fuel is mixed with the air and combustion occurs. Strictly speaking, the fluid composition changes between these stations, and a continuous path between them should not be shown. However, since the fluid characteristics do not change markedly, there is no difficulty in showing the two substances on different portions of the same diagram. The stagnation pressure at (4) must be less than at (3) because of fluid friction and also because of the drop in stagnation pressure due to heat addition at finite velocity. As we shall see later, it is advantageous, and an important aspect of the present subject matter, to make $T_{04}$ as high as material limitations will allow. Hence states (04) and (4) are fairly well fixed.

From (4) to (5), the fluid expands through the turbine, providing shaft power equal to the shaft power input to the compressor (plus any mechanical losses or accessory power). Since no work or heat transfer occurs downstream of station (5), the stagnation enthalpy remains constant throughout the rest of the machine.

State (6) depends on the geometry involved, but $p_{06}$ must be less than $p_{05}$. The exhaust pressure $p_7$ generally equals the atmospheric pressure $p_a$, but it may be different if the exhaust flow is supersonic. If state (7) is known, the velocity $u_7$ can be calculated from the known $h_{07}$ (or $h_{05}$) regardless of the properties at (6). If the afterburner is operative, the fluid is raised in temperature to state (06A), after which it expands in the nozzle to state (7A).

Again it can be seen that the exhaust kinetic energy is the relatively small difference between the total available enthalpy drop from state (04) and the compressor work input. For a given compressor-pressure ratio, irreversibilities increase the compressor power requirement while at the same time increasing the necessary turbine pressure drop. Both effects decrease the exhaust kinetic energy, so that overall performance may be expected to be very sensitive to compressor and turbine performance.

Embodiments of the present subject matter also rely on electromagnetics, a discussion of which follows.

Electro Magnetics

Moving charges can experience forces other than those which they would experience at the same position without motion. These are magnetic forces, and the regions in which they occur are called magnetic fields. Magnetic forces depend on the magnitude of the charge, the magnitude and direction of the charge velocity, and the strength of the magnetic field. In general, the magnetic force on a charge at velocity $\bar{u}$ is given by the vector product $$\bar{F} = q\bar{u} \times \bar{B} \qquad (20)$$

Equation 20 may be considered a definition of the magnetic field intensity vector B, which is also called the magnetic induction or magnetic flux density having units, in the MKS system, of:

$$\frac{\text{newton/coulomb}}{\text{meters/second}} = \frac{\text{volt} - \text{seconds}}{(\text{meter})^2} = \frac{\text{webers}}{(\text{meter})^2}$$

The gauss is another common unit for magnetic flux density. It is related to the rationalized MKS unit by:

1 weber/m² = 10⁴ gauss.

The earth's weak magnetic field is only about 0.5 gauss, while "strong" permanent magnets may produce 5 to 10 thousand gauss at a pole face, and very strong electromagnet may produce $10^6$ gauss.

Since an electrical current consists of charges in motion, the force on a current carrying element can be determined from the forces on the individual charges. The current density vector j is defined as the rate per unit area at which charge travels through the current-carrying element. It is measured in coulombs per second per square meter or amperes per square meter. The current density is related to the volume charge density $\rho_q$ of the moving charges and their velocity u by $$j = \rho_q u \qquad (21)$$

The electromagnetic force dF on the charge $\rho_q dv$ contained within any increment of volume dv is $$dF = (\rho_q dv) u \times B = (dv) j \times B \qquad (22)$$

Therefore the force per unit volume is $$F = j \times B \qquad (23)$$

The acceleration of particles by these magnetic forces is an important aspect of the present subject matter. To facilitate an understanding of the relationship of these accelerated particles to the overall air stream, a discussion of macroscopic and microscopic particle interactions follows.

Particles

The relationships between macroscopic (i.e., continuum) properties and the microscopic particle motions are given by kinetic theory. The pressure exerted by a gas containing n particles per unit volume, each particle being of mass m, is given by $$p = \frac{1}{3} n m \bar{u}^2 \qquad (24)$$

where $\bar{u}^2$ is the average squared velocity given by:

$$\bar{u}^2 = \frac{\int_0^n u^2 dn}{n} \qquad (25)$$

in which dn is the number of particles having velocities from u to u+du and n is the total number of particles. The average squared velocity and temperature are related by: in which is shown graphically in FIG. 9.

$$\frac{1}{3} m \bar{u}^2 = \frac{\bar{R}}{N_0} T = kT \qquad (26)$$

where, $N_0$=Avogadro's number, 6.0251×10²⁶ molecules/kg-mole, $\bar{R}$=universal gas constant=8.3144×10³ joules/kg=mole ° K, and k=Boltzmann's constant=1.3803×10⁻²³ joules/molecule ° K This is usually expressed in terms of the average particle kinetic energy, $$\frac{1}{2} m \bar{u}^2 = \frac{3}{2} kT \qquad (27)$$

In these expressions, u is a measured relative to the bulk motion of the gas so that p and T are, as the notation indicates the static properties of the gas. In addition to the root-meansquare velocity, which is sufficient for the expressions, we shall be interested in two additional average particle velocities.

$$f(u) = \frac{4}{\sqrt{\pi}} \left(\frac{m}{2kT}\right)^{3/2} u^2 e^{-mu^2/2kT} \quad (28)$$

which is shown graphically in FIG. 9.

It may be verified from Equation 28, that the root-mean-square velocity, consistent with Equation 27, is:

$$u_{rms} \equiv \sqrt{\overline{u^2}} = \sqrt{3kT/m} \quad (29)$$

The average or arithmetic velocity is $$u_{ave} = \frac{1}{n}\int_0^n u\, dn = \sqrt{(8/\pi)(kT/m)} \quad (30)$$

and the most probable velocity (that with the highest dn/du) is $$u_{mp} = \sqrt{2(kT/m)} \quad (31)$$

Another important variable in gas or plasma behavior is the collision frequency. Here, a collision is defined as that which occurs when one particle enters the force field of another and therefore undergoes a change in its motion.

Consider the motion of a single particle through a "sea" of surrounding particles. The frequency with which it collides with other particles is proportional to its average speed $u_{ave}$ and the number of particles per unit volume:

$$v = Qnu_{ave} \quad (32)$$

The proportionality constant Q is measured in units of area and is called the collision cross section for a particular type of collision. Collisions may be classified according to the result of the interaction. For example, one may be interested only in the frequency of collisions which result in ionization, or in the loss of a certain increment of momentum, etc. This information can be collected by defining separate proportionality constants, called cross sections for the separate processes such as "ionization cross section," etc. If there are several "target" species, the total collision frequency of that type is the sum of the separate terms:

$$v = u_{ave}\sum_j Q_j n_j \quad (33)$$

It is possible (though in some instances misleading) to interpret the cross section as the geometric area of the target. Consider the simple case of collisions between rigid spheres. As a "projectile" of radius $r_1$ travels through a sea of "targets" of radius $r_2$. It is clear that any targets whose centers are within a cylinder of radius, $r_1+r_2$ centered on the path of the projectile will be hit. As the projectile moves, it sweeps out a collision volume at the rate $\pi(r_1+r_2)^2 u_{ave}$, and collisions occur at the rate of:

$$v=\pi(r_1+r_2)^2 u_{ave} n \text{ where}$$

$$Q=\pi(r_1+r_2)^2 \quad (34)$$

This simple picture does not account for the motion of the targets or for the distribution of projectile velocities. Computations which allow for these effects yield a correction factor for Equation 33 which is an order of magnitude unity. For the particular case of electron projectiles, it is quite reasonable to assume that the targets are at rest since almost all the relative motion is due to the much faster electrons. However, if the treatment is to be accurate, it is necessary to take into account the distribution of electron velocities.

Associated with the collision frequency is the mean free path A, or average distance between collisions; which can be obtained by dividing the total distance traveled by the number of collisions during the travel time t. Thus:

$$\lambda = \frac{u_{ave}t}{vt} \quad (35)$$

or $$\lambda = \frac{1}{\sum_j Q_j n_j} \quad (36)$$

The collision cross section may be subdivided according to the nature of the interaction. The simplest interaction is an elastic collision in which the total kinetic energy of the particles is conserved. In inelastic collisions, energy is also conserved, of course, but part of the energy is absorbed by the particles, causing, for example, ionization or radiation.

As seen from the above equations, the average squared velocity can be increased by increasing the velocity u of a subset of total particles in the control volume or all of the particles and an increase in the velocity of a particle results in an exponential increase in its pressure contribution.

Gas turbine engine designers are constantly trying to increase the thrust or power output from a given engine, reduce its weight, and/or decrease the fuel consumption for a specified output. One method to achieve these improvements is to operate at as high a turbine inlet temperature as possible. The turbine inlet temperature however is limited by the thermal and structural characteristics of current materials. Improvements in these characteristics have allowed the maximum turbine inlet temperature to slowly increase, over time.

One prior art method used to increase the turbine inlet temperature without relying on improvements to materials has been the use of turbine cooling, which allows the turbine inlet temperature to be increased while maintaining a constant blade (material) temperature. Although turbine blade cooling allows higher turbine inlet temperatures, detrimental effects do result because of the turbine cooling. These detrimental effects include added cost for producing turbine blades, reduction in turbine blade reliability, loss of turbine work due to the cooling air bypassing one or more of the turbine stages, losses due to the cooling air being mixed with the hot gas stream, and a decrease in stream enthalpy when the cooling air is mixed with the hot gas stream.

It is an object of the present subject matter to obviate the deficiencies in the prior art and present a novel gas engine. The gas engine including a rotating magnetic field with a first set of magnetic flux lines proximate to an inlet, and a second set of magnetic flux lines proximate to the exit; a combustion chamber between an inlet and exit; and wherein an ionized gas stream having a net charge enters said duct via said inlet through the first set of magnetic flux lines, passes into the combustion chamber and exits the duct through the second set of magnetic flux lines and the exit. The gas engine exploits the interaction between the rotating magnetic field and the charged ions to compress and extract work from the air stream.

It is also an object of the present subject matter to present a novel method for extracting work out of a gas. The novel method including providing a gas stream with a net charge; compressing the gas stream by exposing the gas stream to moving magnetic field having a first set of magnetic flux lines having a first velocity vector thereby accelerating particles in the gas stream in a direction normal to the first set of flux lines and normal to the first velocity vector and heating the compressed gas stream. The method also including expanding the heated gas stream to increase the gas stream's velocity and exposing the expanded gas stream to a second magnetic field defined by a second set of magnetic flux lines thereby imparting a force normal to the gas stream velocity and the second set of magnetic flux lines on the second magnetic field and extracting the work from the rotation of the second magnetic field.

It is still another object of the present subject matter to present an air breathing thruster capable of generating thrust at flight velocities throughout the range from M=0 to Mach=6 by operating on an air stream with a rotating magnetic field. The air breathing thruster including a continuous air stream path, a magnetic flux compressor, a combustion chamber downstream of the magnetic flux compressor and a magnetic flux turbine downstream of the combustion chamber. The magnetic flux compressor including a first portion of a rotating magnetic field, where the rotating magnetic field has a local velocity generally perpendicular to the air stream path proximate the magnetic flux compressor. The magnetic flux turbine downstream of the combustion chamber comprising a second portion of the rotating magnetic field with a second local velocity generally perpendicular to the air stream path proximate the magnetic flux turbine and anti-parallel to the local velocity with respect to the air stream path proximate the magnetic flux turbine. The rotation of a first portion in the flux compressor and the rotation of the second portion in the flux turbine of the rotating magnetic field are coupled.

These and many other objects and advantages of the present subject matter will be readily apparent to one skilled in the art to which the invention pertains from a perusal of the claims, the appended drawings, and the following detailed description of preferred embodiments.

DETAILED DESCRIPTION

The present subject matter overcomes the deficiencies in the prior art by introducing or generating charged particles within an air stream and manipulating the air stream with magnetic fields operating on the charged particles. For the purposes of this disclosure charged particles and ionized particles are used synonymously. Embodiments of the present subject matter compress the air stream by accelerating charged particles with a moving magnetic field, where the magnetic field possesses a velocity perpendicular to its flux lines. The increased velocity of the charged particles increases the statistical mean particle velocity and thereby, as discussed previously, increases the pressure of the air stream. The compressed air stream is then heated and expanded through a second magnetic field. The expansion of the air stream substantially increases the velocity of the air stream and the charged particles therein. The interaction of the high velocity charged particles impart a force perpendicular to the flux lines of the second magnetic field and the velocity of the charged particles. This force powers the movement of the magnetic field and can also be extracted in the form of mechanical work.

The advantages of the present subject matter over the prior art should be clearly evident. The restraint on turbine inlet temperature $T_{04}$ as a result of material limitations is substantially lifted, the viscous losses due to interaction between the compressor and turbine blades are eliminated and the operating velocity range can extend from the low end of turbojets to the top end of ramjets without the problems associated with each. In fact, embodiments of the present subject matter can switch between operations as a turbo jet to operation as a ramjet with the proverbial flick of a switch.

Figure 1:
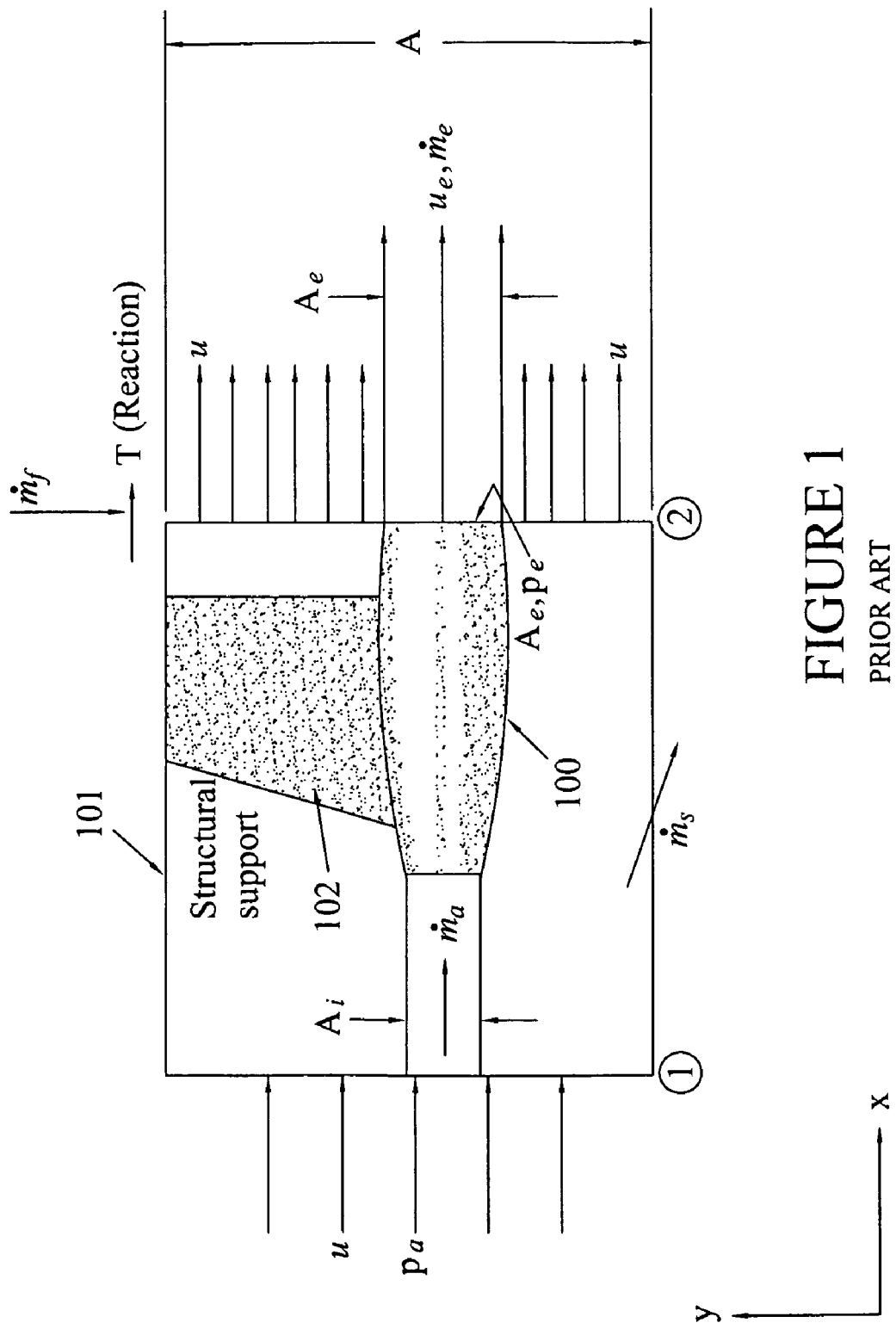
FIG. 1 is a representation of a generalized thrust producing device.
Figure 2:
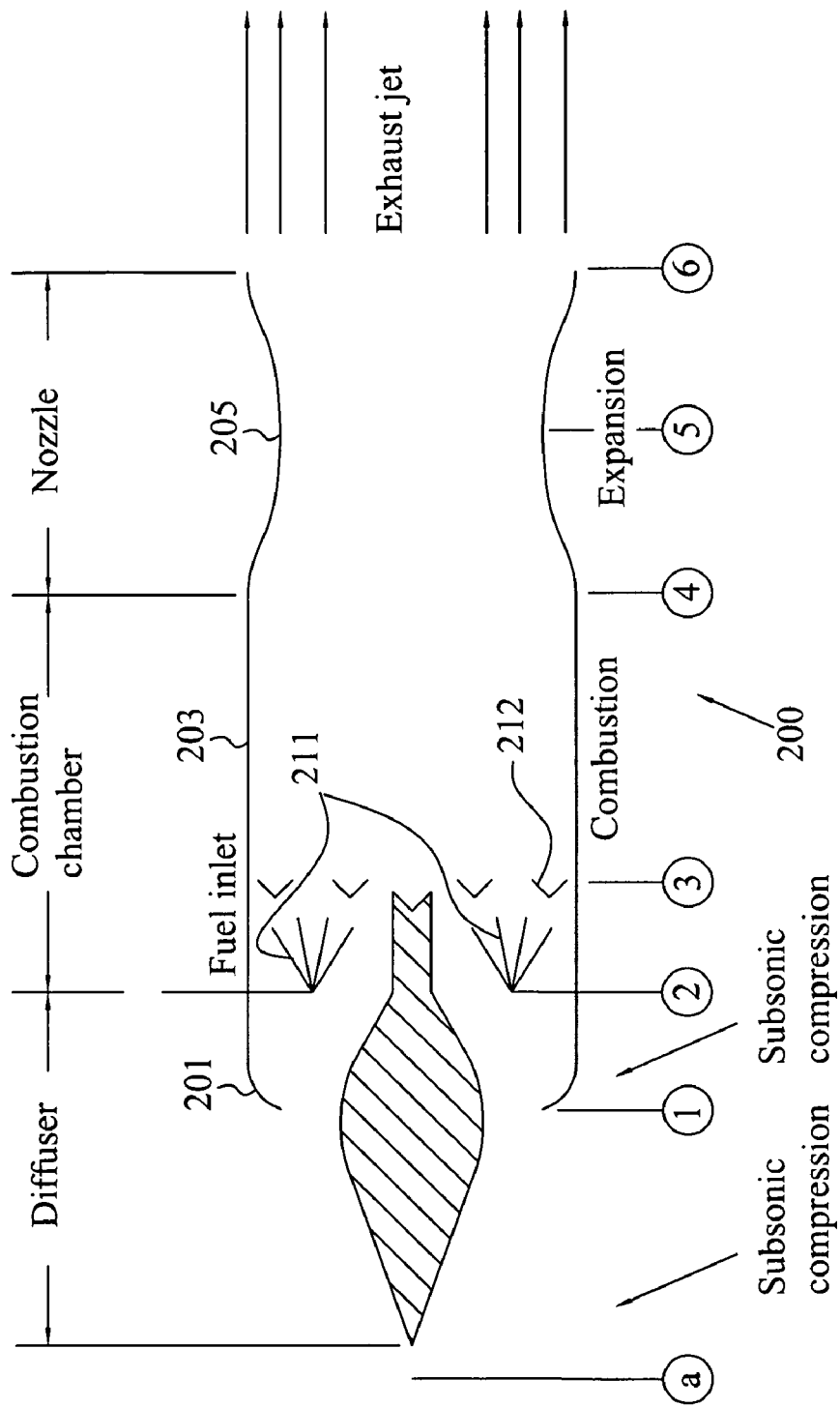
FIG. 2 is schematic diagram of a prior art ramjet engine.
Figure 3:
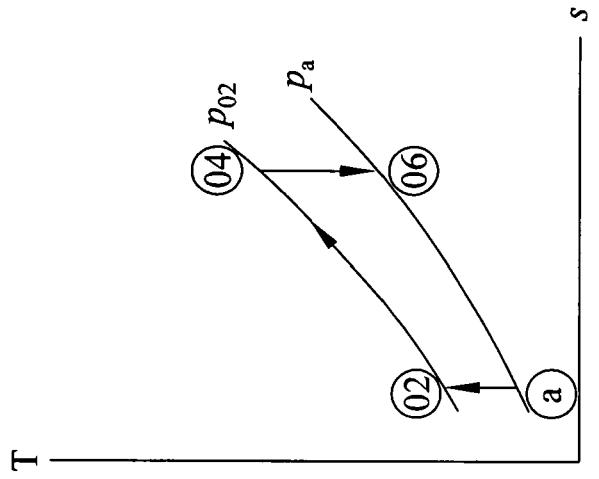
FIG. 3 is a representation of the thermodynamic path of fluid in an ideal ramjet.
Figure 9:
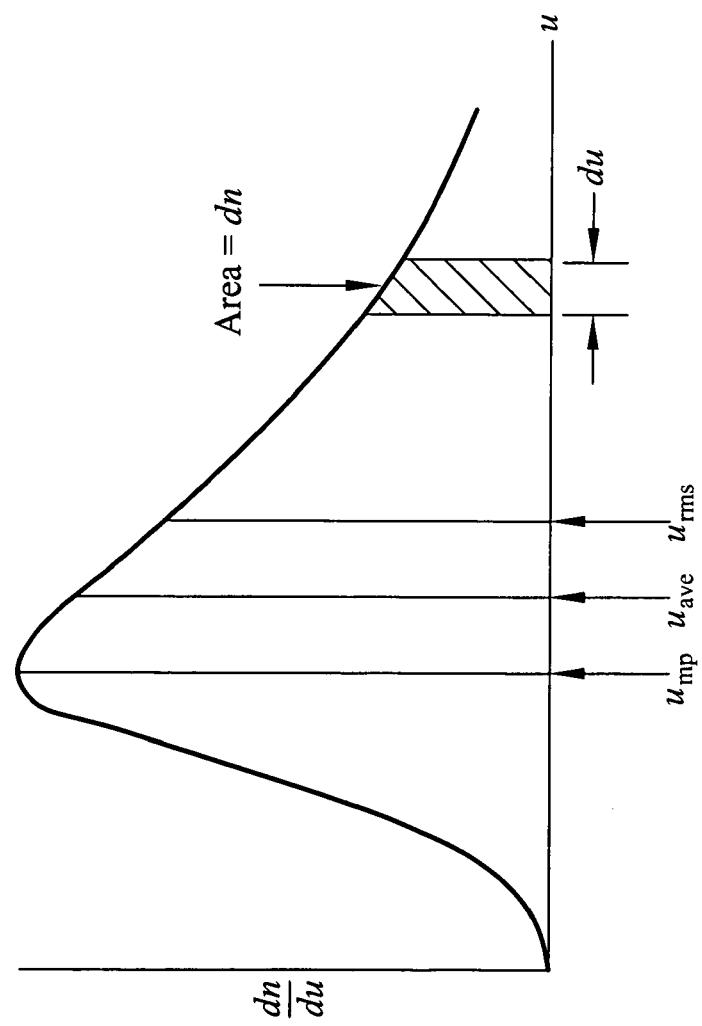
FIG. 9 is Maxwell velocity distribution, showing most probable, arithmetic mean, and root-mean-square velocities.
Figure 4:
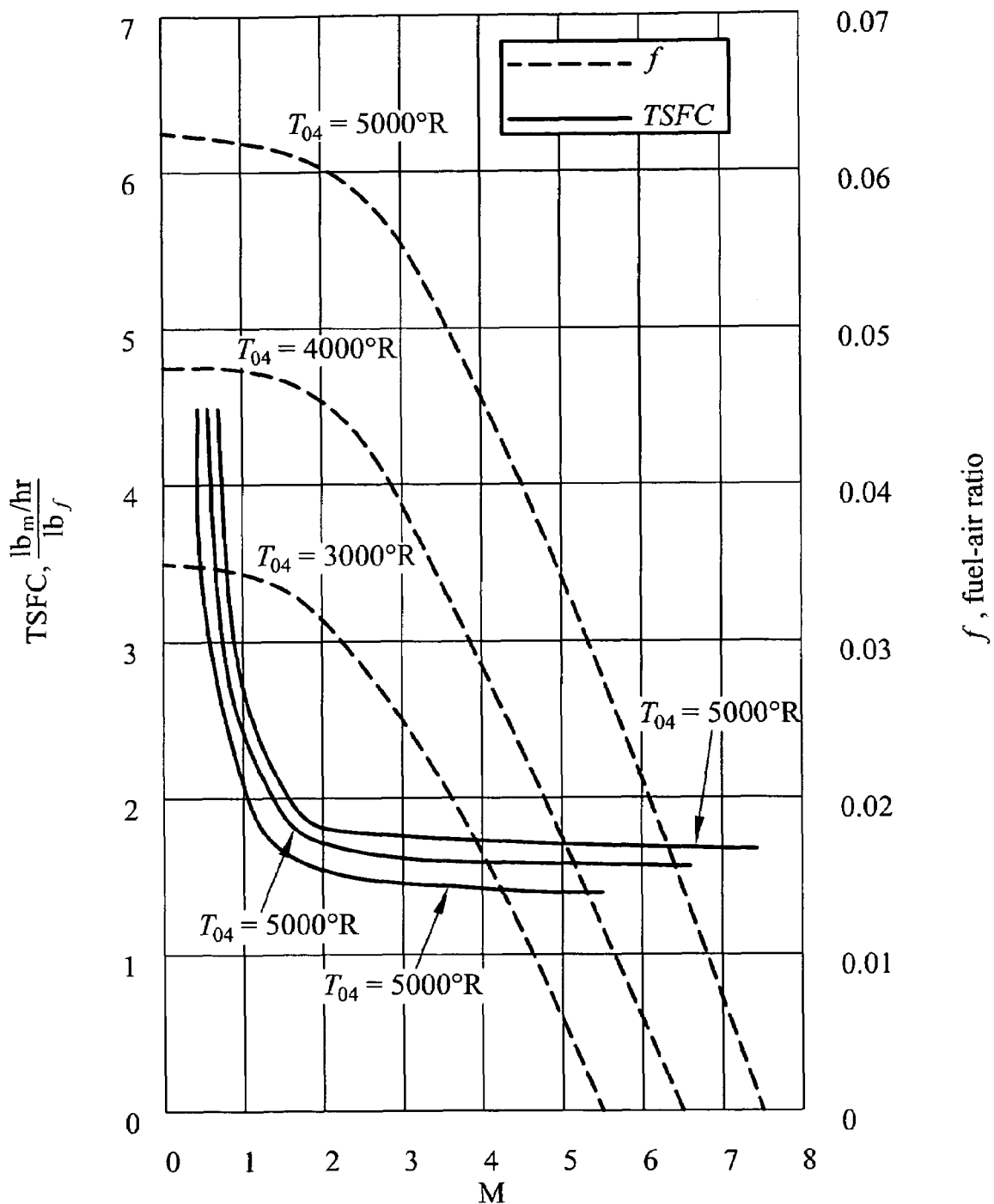
FIG. 4 is a performance chart of three ideal ramjets.
Figure 5:
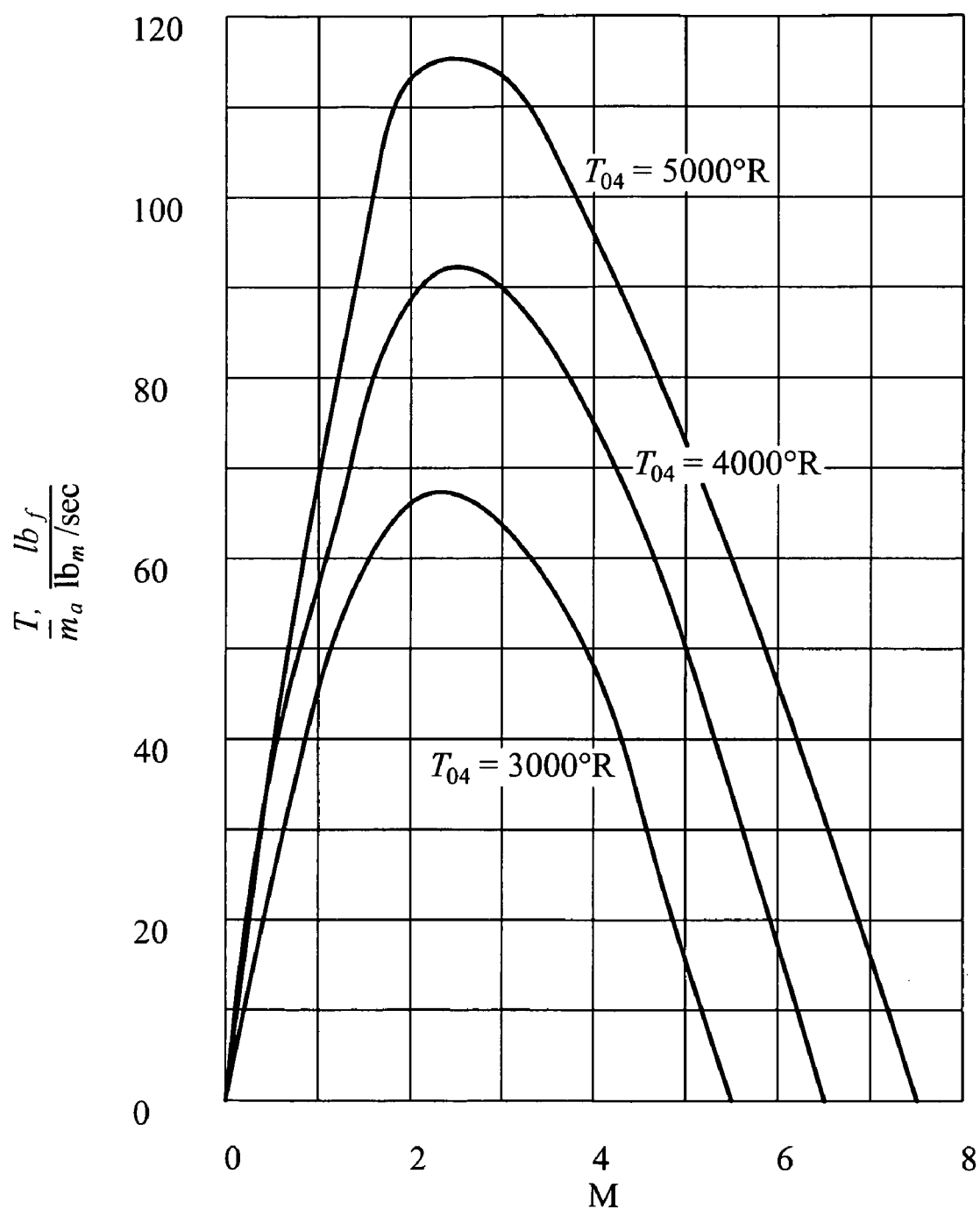
FIG. 5 is a representation of thrust per unit airflow for three ideal ramjets.
Figure 6:
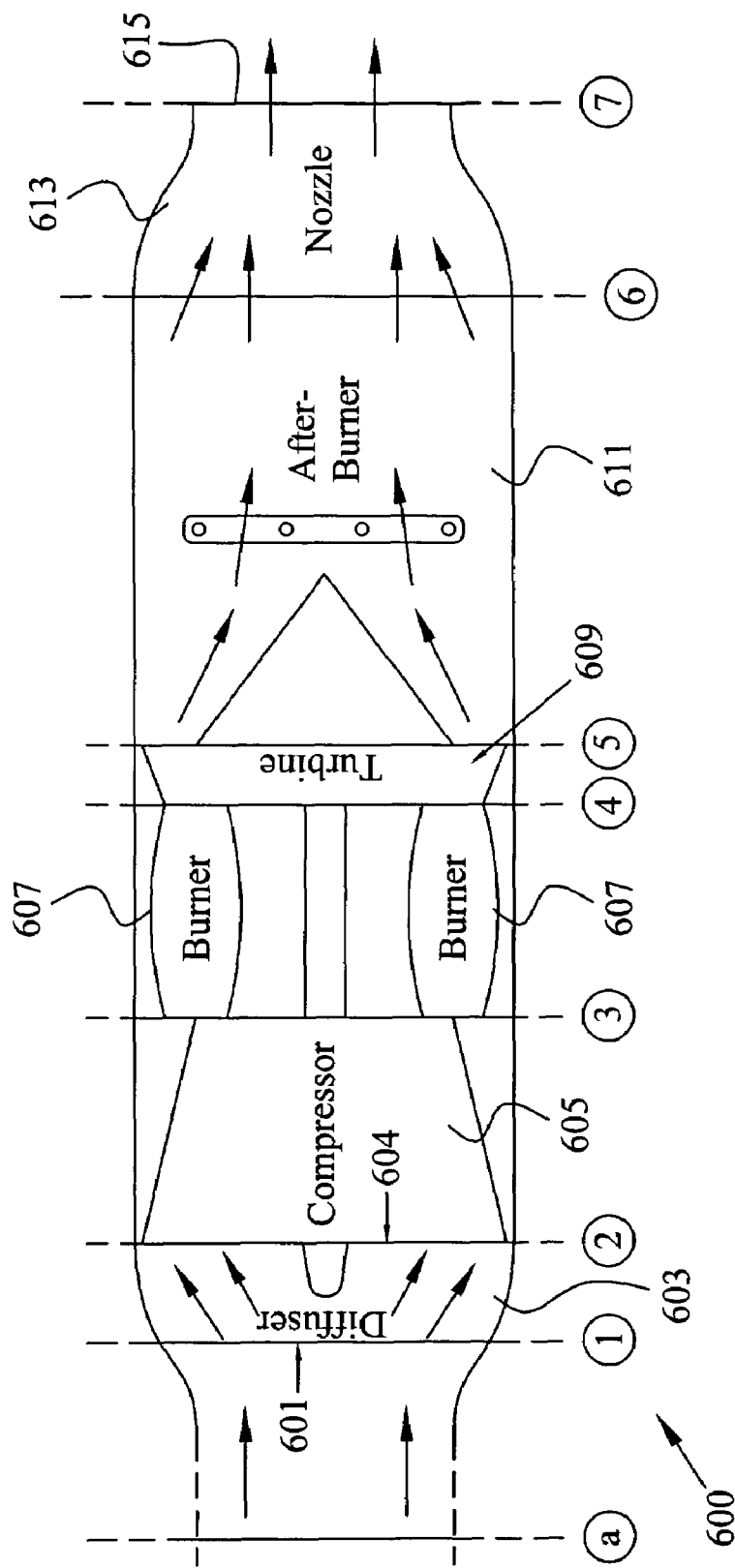
FIG. 6 is schematic diagram of a prior art turbojet engine.
Figure 7:
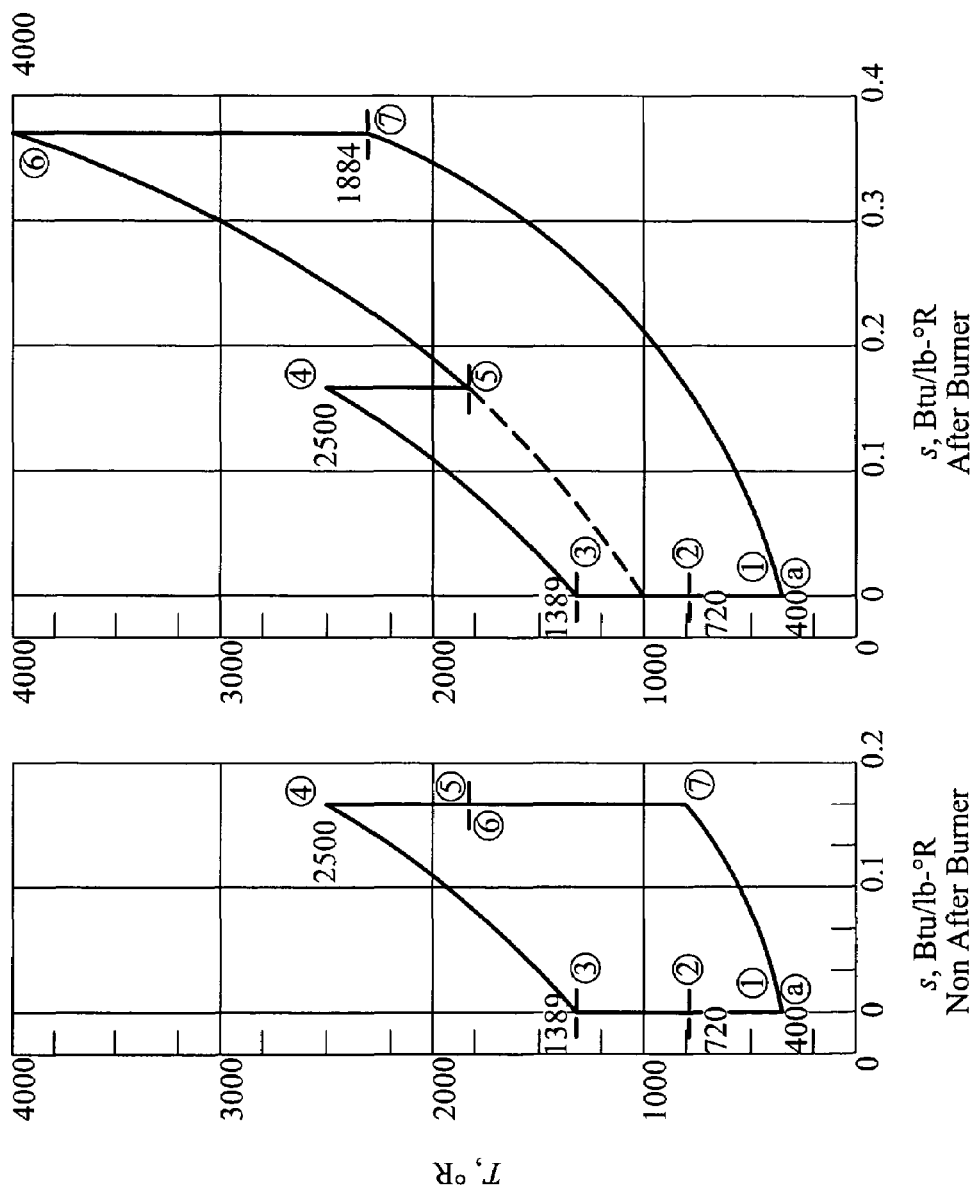
FIG. 7 is a T-s diagram for afterburning and non-afterburning ideal turbojet engines.
Figure 8:
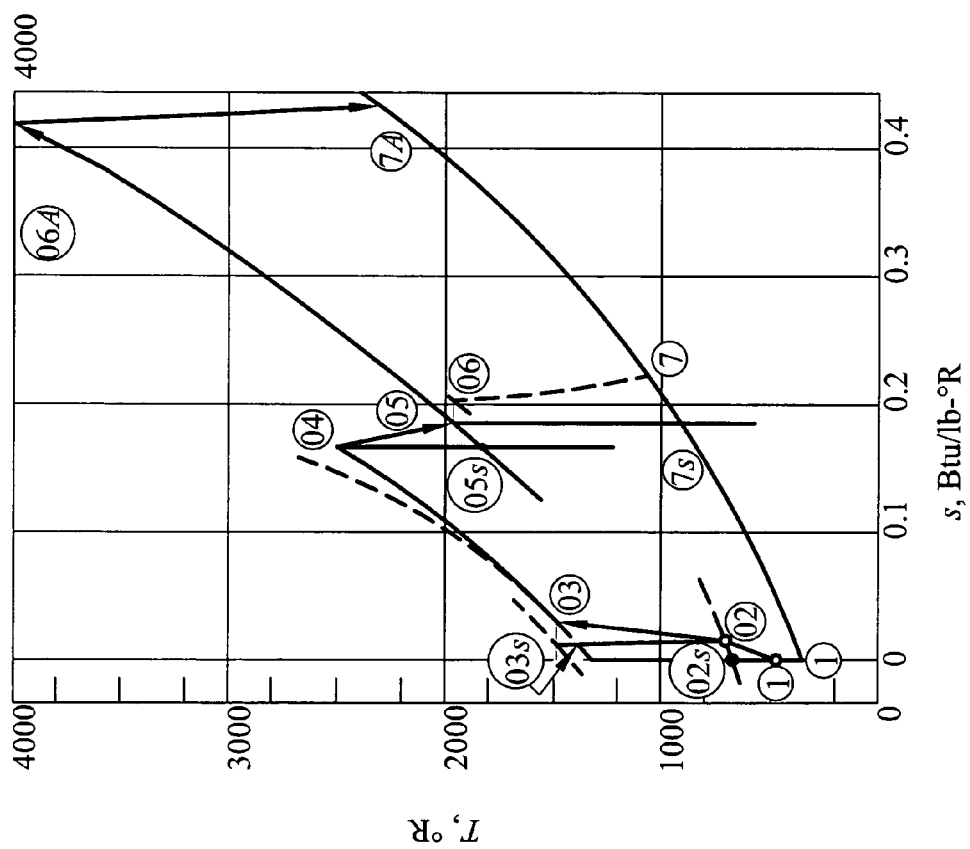
FIG. 8 is a T-s diagram for prior art real turbojet engine.
Figure 10:
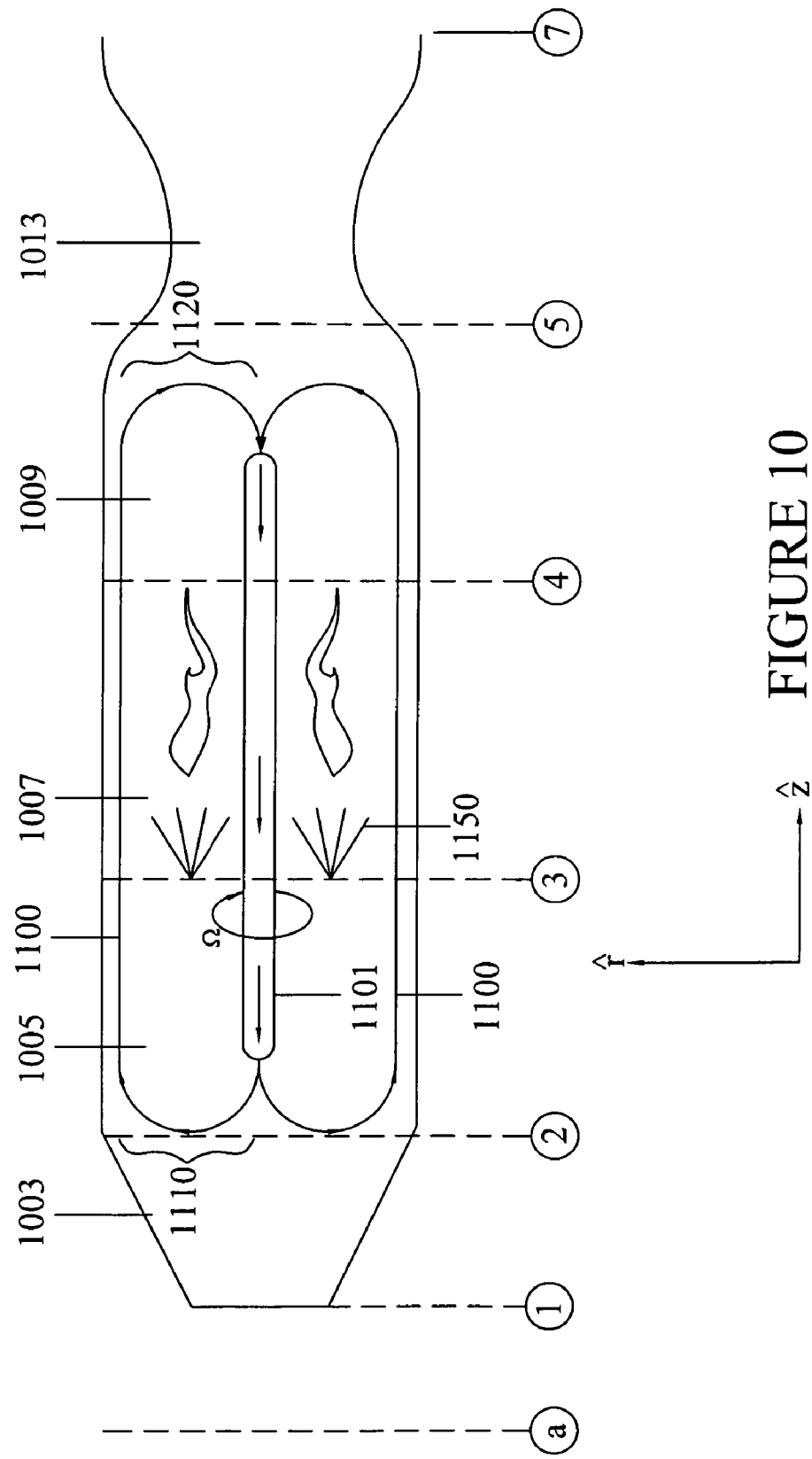
FIG. 10 is a schematic diagram of an embodiment of the present subject matter.

FIG. 10 is a schematic diagram of an embodiment of the present subject matter. An ionized air stream having a net negative charge is provided at the inlet (a), the air stream may also have a net positive charge but for clarity the embodiment in FIG. 10 is discussed using an air stream having a net negative charge. The net negative charge can be a result of ionizing the air, an introduction of negatively charged particles, or a reduction of positively charged particles. Pressure is recovered from the air stream by the diffuser 1003 at (1) and then is compressed by the flux compressor 1005 between stations (2) and (3). The interaction of the ionized particles in the air stream with the rotation or relative movement of the magnetic field 1100 is responsible for the increase in pressure from the flux compressor 1005. Ionized particles with a negative charge are exposed to the portion of the moving magnetic field 1110 emanating out of the magnetic core 1101. The magnetic field is defined by a plurality of magnetic flux lines which collectively define the magnetic field intensity vector, or magnetic flux density. The flux field as shown in FIG. 10 has a component 1110 in the outward radial direction and since the magnetic field is rotating about the core's axes it has a velocity of $\Omega r \hat{\theta}$ where $\Omega$ is the angular velocity of the rotating magnetic core 1101 and r is the radial distance from the center of the magnetic core 1001. The relative velocity between the magnetic flux lines and the charged particle is $|\Omega r|\hat{\theta}$; therefore, an examination of the interaction of a negatively charged particle with the magnetic flux density can be viewed using the flux lines as the reference, in which case the particle has a velocity of $-\Omega r \hat{\theta}$. Thus, it follows that the force exerted on the negatively charged particle is $-q\Omega r B \hat{z}$, where $\hat{z}=\hat{\theta}\times r$, in a cylindrical coordinate system. Therefore the negatively charged particle is accelerated in the $-z$ direction, resulting in an increase in pressure as governed by equation (24). Thus, the increase in pressure for the air stream is largely a function of charge density, magnetic field density and angular velocity, between r' and r.

The work exerted on the air stream is therefore a function of volume charge density $\rho_q$, magnetic field density and angular velocity and may be expressed as $$\int_{r1}^{r} 2\pi r^3 (\rho_q) \Omega B dr$$

or generally as $\int f(\rho_q, B, \Omega, r)$.

The power consumed by the rotating magnetic flux lines in compressing the air stream, i.e. the flux compressor 1005, is supplied by expanding the air stream through a second set of magnetic flux lines or flux turbine 1009. The compressed air stream, prior to expansion is heated by mixing and burning of fuel in the air in combustion chamber 1007 or heater. The air is then expanded through the flux turbine 1009 to obtain power to drive the flux compressor 1005 and extract additional work if so configured. It is the interaction of the charged particles through the magnetic flux lines of the flux turbine 1009 which generate the force and thus it is the movement of the flux turbine 1009 which allows work to be extracted. The expansion of the air stream increases the velocity of the air stream and thus the individually charged particles. Whereas the interaction between the particles and the flux compressor 1005 is driven primarily as a result of the rotation of the magnetic flux lines 1110, thus creating a relative velocity between the particle and the flux lines in the $\hat{\theta}$ direction. The interaction between the charged particles and the flux turbine 1009 are driven primarily as a result of the relative velocity between the charged particles and the magnetic flux lines 1120 of the flux turbine 1009 in the z direction. The force exerted on the magnetic field 1120 of the flux turbine 1009 $F=qu\times B=qu_z\hat{z}\times -b\hat{r}=qu_zB\hat{\theta}$ and the work provided can be expressed generally as:

$$\int f(\rho_q, B, u_z). \quad (38)$$

When used as a power plant, the air stream is more fully expanded as it passes through the flux turbine 1009 in order to extract the most work via the flux turbine 1009; however, in the case of a propulsion device, the air stream is expanded only enough such that the work supplied by the flux turbine 1009 is substantially equal to the work required by the flux compressor 1005. The air stream is further expanded downstream of the flux turbine 1009 in a nozzle 1013 which has the effect of generating thrust for propulsion.

The steady state operating point occurs where the turbine power, governed by equation 38, is equal to the power required to drive the flux compressor 1005, governed by equation 37, or in the case of power generation equal to the power required to drive the flux compressor 1005 and the extracted power.

$$\int f(\rho_q, B, u_z) dr = \int f(\rho, B, \Omega, r) dr + \text{extracted work}. \quad (39)$$

The expansion of the gas prior to exiting through the portion of the magnetic field 1120 can be altered (or controlled) to regulate the turbine power. The more the gas is expanded, the larger the velocity of the ions, and thus an increase in the power extracted from the air flow and vice versa, as can be seen by inspection of Equation 39.

Hereto for, the interactions have been described with relative velocities perpendicular to the magnetic flux lines. This was done for clarity only; it is very likely that the relative velocity will not be perpendicular to the magnetic flux lines, such eccentricities do not diminish the operation of the engine as described. For the description of the present subject matter only components of the relative velocity perpendicular to the flux lines are discussed for simplicity purposes. Furthermore, the inlet velocity of the air stream is assumed to be negligible with respect to the rotation speed of the flux compressor and will not be included in the discussion.

Figure 11:
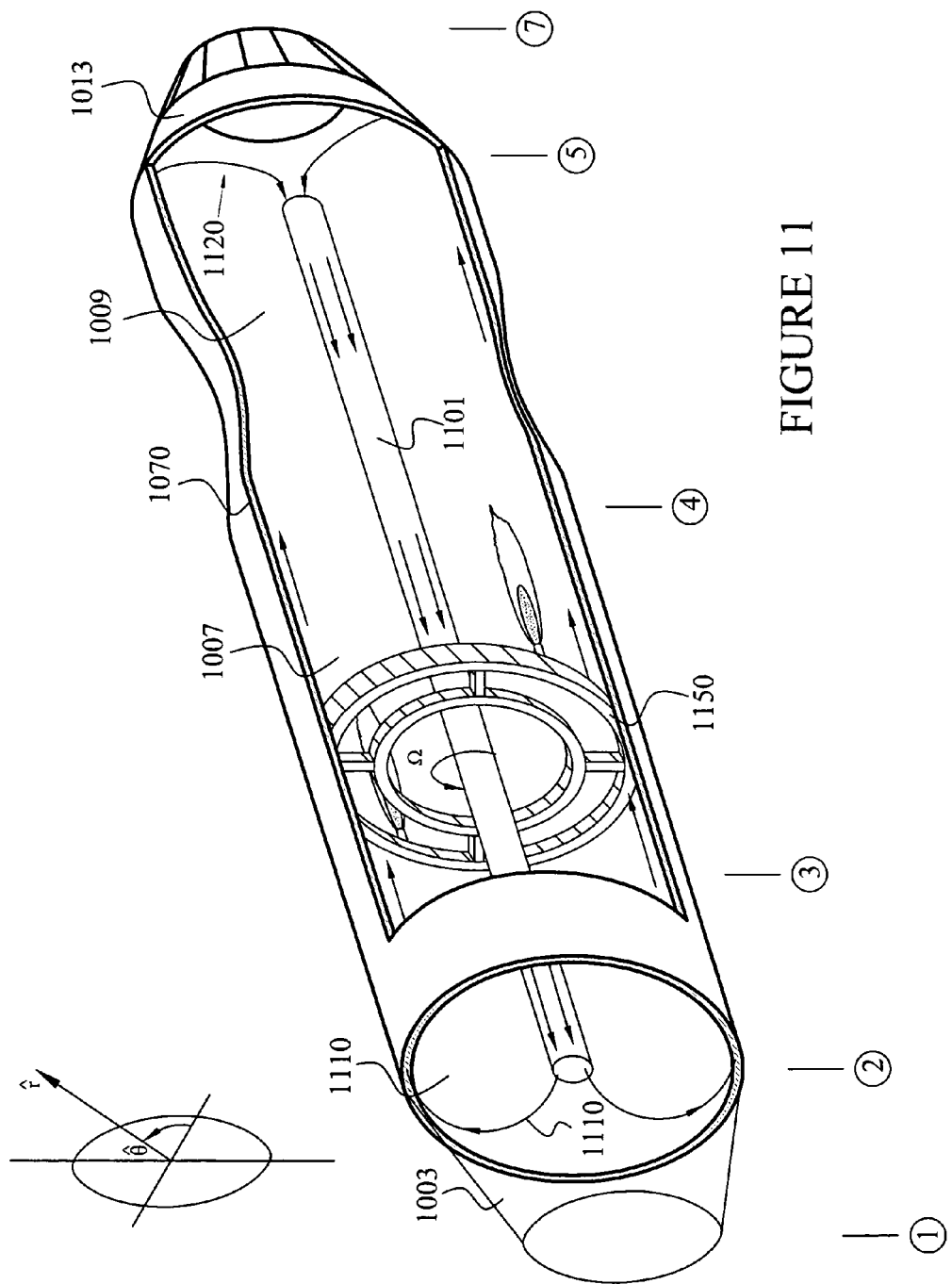
FIG. 11 is a representation of an embodiment of the present subject matter.

FIG. 11 shows an embodiment of the present subject matter. The ionized air stream enters through the diffuser 1003 through the flux compressor 1005, becomes heated in the combustion chamber 1007 and expands out through the flux turbine 1009 and further expands through the nozzle 1013. The rotating magnetic field defined by flux lines 1110 at the inlet and flux lines 1120 at the outlet is generated, in this embodiment, by a permanent bar magnetic 1101 rotating at an angular velocity $\Omega$, however other mechanisms for generating the rotating magnetic field are equally envisioned. The outer casing 1070 is preferably constructed with a magnetically conducting material, such as a ferrous metal. The magnetically conducting material further allows the flux lines to effectively complete the magnetic circuit from the inlet to the outlet and further serves to concentrate the magnetic field and shield the objects in the vicinity of the engine from the magnetic field. The selection of the magnetic conducting material will also involve other considerations, such as material strength, weight and temperature tolerance and other well-known engineering principles. The embodiment shown in FIG. 11 requires an ionized air stream with a net charge.

As noted earlier, an advantage of this embodiment as well as others, is that as the Mach number of the air stream is increased, the diffuser 1003 combustion chamber 1007 and nozzle 1013 can effectively operate as a ramjet, independent of the flux compressor 1005 and flux turbine 1009 and thus, the requirement for an ionized field can be lifted. However, this embodiment is preferably, but not exclusively, used in a closed system, since the ionized stream can be recycled, and thus power losses from generating the ionized stream can be minimized.

Figure 12:
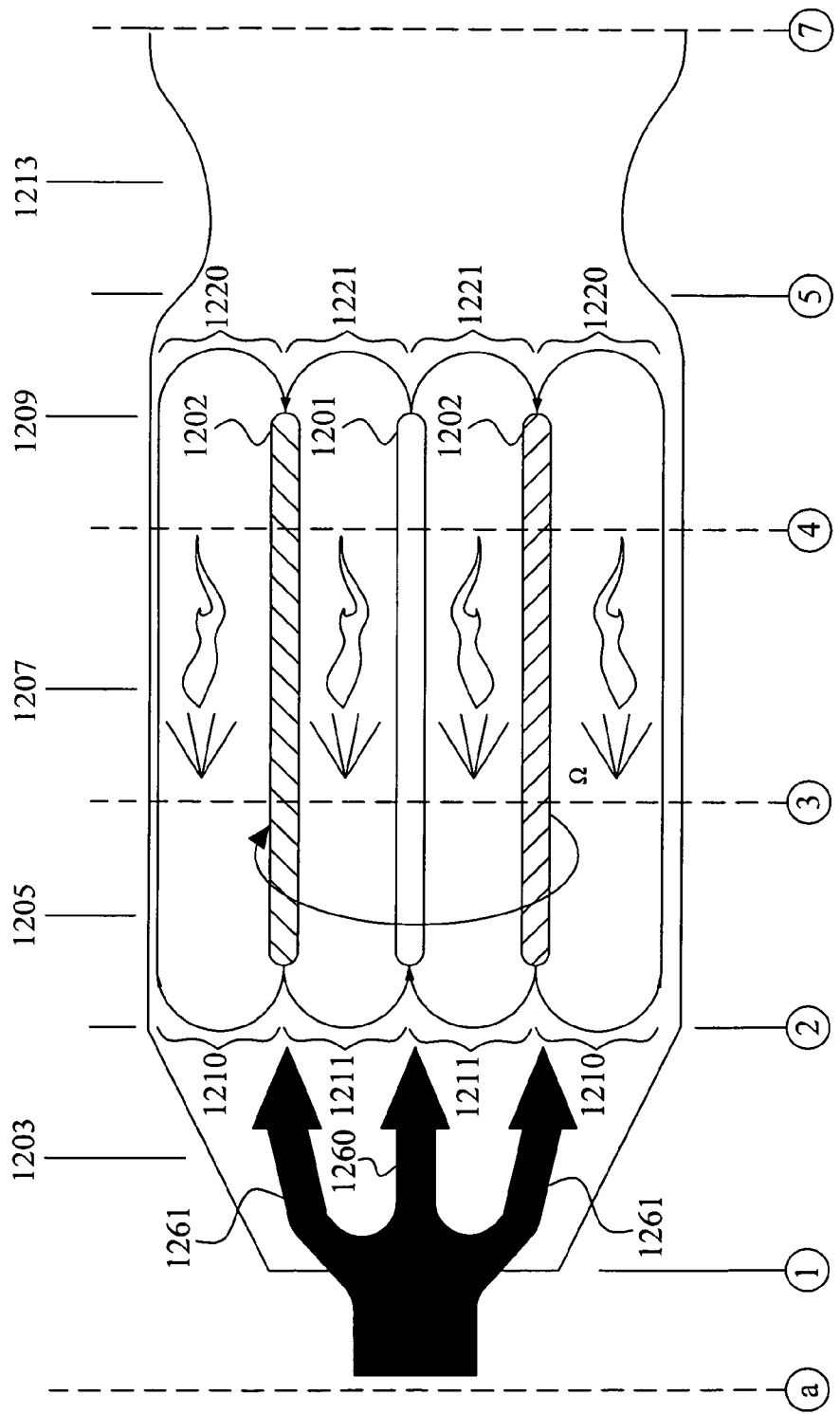
FIG. 12 is a schematic diagram of another embodiment of the present subject matter.

FIG. 12 shows a schematic of another embodiment of the present subject matter. The embodiment in FIG. 12 divides the ionized stream into a positive 1260 and negative 1261 stream and operates on each stream independently. The embodiment of FIG. 12 recognizes that an ambient gas, such as air, is comprised of generally neutral particles that can be ionized or separated into two streams of equal and opposite charges, so that while, on a macro level, the total stream is generally neutral, the individual streams can each have a net and opposite charge and may be operated on as discussed above.

An air stream separator is preferable for operation in a neutral gas environment and is discussed at a later time. In the schematic diagram the stations are the same as discussed throughout. The gas stream is compressed in diffuser 1203 and divided into an outer stream with, for exemplary purposes, a net negative charge and an inter stream with a net positive charge. In the embodiment shown an outer duct concentric with an inner duct are divided by a magnetic cylinder 1202 and preferably a conductive casing. The outer duct and the inner duct each comprise an inlet and an exit represented generally by stations (2) and (5) respectively. The rotating magnetic field can be generated by a magnetic cylinder 1202 rotating about an axis. Additionally, a center bar 1201 can be made of magnetically conductive material or an oppositely disposed bar magnetic. The magnetic field is described by a first set of magnetic flux lines 1210 with a radial component in a positive direction normal to the axis and located generally between the boundary and a periphery of the outer chamber near the inlet at station (2) and a second set of magnetic flux lines 1220 with a radial component in a negative radial direction normal to the axis and between the boundary and the periphery of the outer chamber proximate to the outlet generally at station (5).

The negatively charged gas stream enters the inlet of the outer chamber, through the first set of magnetic flux lines 1210 of the flux compressor 1205 where it is compressed by its interaction with the magnetic field. The compressed gas stream is mixed with fuel and combusted in a combustion chamber 1207, expanded out through the second set of magnetic lines 1220 of the flux turbine 1209 and exhausted through the nozzle 1213.

The inner chamber includes a third set of magnetic flux lines 1211 with a radial component in the negative direction normal to the axis and between the magnetic cylinder 1201 and the bar 1201 proximate to the inlet at station (2) and a fourth set of magnetic flux lines 1221 with a radial component in the positive direction normal to the axis and between the magnetic cylinder 1202 boundary and the bar 1201 at the axis proximate to the outlet at station (5).

The positively charged gas stream enters the inlet of the inner chamber, through the third set of magnetic flux lines 1211 of the flux compressor 1205 where it is compressed by its interaction with the magnetic field. The compressed gas stream is mixed with fuel and combusted in a combustion chamber 1207, expanded out through the fourth set of magnetic lines 1221 of the flux turbine 1209 and exhausted through the nozzle 1213.

The combustion chamber 1207 is compartmentalized within each of the outer chamber and the inter chamber and preferably each chamber is separated from the other. The rotation of the first set of magnetic flux lines 1210 about the axis is coupled to the rotation of the second set of magnetic flux lines 1220 about the axis.

Alternatively the center bar 1201 can be made of a dielectric or non magnetic conducting material thereby substantially eliminating the third and fourth set of magnetic flux lines. In such a case, the inner gas stream is not operated on by the magnetic field. Alternatively, as well, the outer casing can be made of a dielectric or non magnetic conducting material. Thus, the first and second sets of magnetic flux lines are substantially eliminated resulting in the outer gas stream not being operated on by the magnetic field. The engine in these alternatives simply bypasses the gas streams in the non operable chambers or with the addition of traditional compressor blades or fans, the engine can extract some of the work from the flux turbine and act as a traditional high bypass turbofan with respect to the magnetically disabled chamber.

Figure 13:
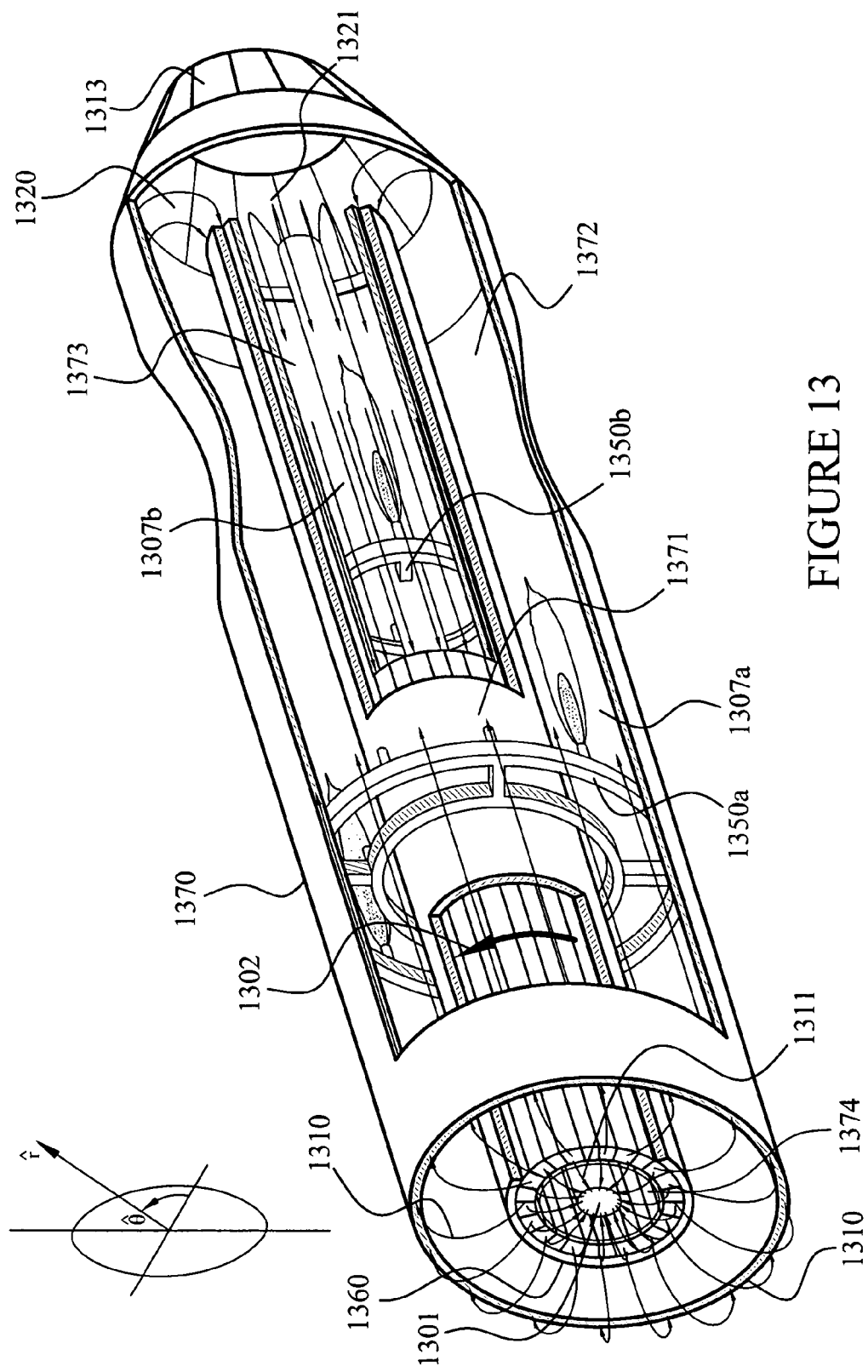
FIG. 13 is a representation of another embodiment of the present subject matter, having inner and outer chambers.

FIG. 13 is a representative illustration of an embodiment of the schematic shown in FIG. 12. The air stream is separated into positive and negative streams. Each stream is compressed, heated and expanded through respective concentric ducts. For the embodiment illustrated in FIG. 13, the negative air stream passes through the outer chamber 1372 while the positively charged air stream passes through the inner chamber 1373.

The outer chamber 1372 is formed between an outer casing 1370 and an inner casing 1371. As noted earlier, the casings are made with magnetically conductive materials. The negatively charged air stream enters through the diffuser 1003 through a set of magnetic flux lines 1310 radiating out of rotating cylindrical magnet 1302. The magnetic flux lines 1310 have a component in the outward radial connection and flow into the outer casing 1370 and periphery of the flux compressor 1205. The reaction between the negative particles in the negative air stream and the rotating magnetic field defined by the set of flux lines 1310 compresses the negatively charged air stream. Fuel is injected into the compressed negatively charge air stream, and combustion is maintained by flame holder 1350*a* in the combustion chamber 1370*a*. The heated air stream is then expanded through the set of magnetic flux lines 1320 radiating out of the periphery of the flux turbine 1209 at the outer casing 1370 and into the rotating magnetic cylinder 1302. This second set of magnetic flux lines 1320 have a component in the opposite radial direction as the first set of magnetic flux lines 1310. The expanded air stream is then further expanded through the nozzle 1313. This additional expansion, along with the force generated by the flux compressor 1205 on the air stream, generates the engine's thrust.

The inner chamber 1373 is formed between a second inner casing 1374 and a magnetic bar 1301 having a magnetic orientation opposite of the magnetic cylinder 1302. The rotation of the magnetic bar 1301 is coupled to the rotation of the magnetic cylinder 1302. The positively charged air stream enters through the diffuser 1203 through a third set of magnetic flux lines 1311 radiating out of the rotating cylindrical magnet 1302. The magnetic flux lines 1311 have a component in the inward radial direction and flow into the center magnetic bar 1301 in the center of the flux compressor 1205. The reaction between the positive particles in the positive air stream and the rotating magnetic field defined by the third set of flux lines 1311 compresses the positively charged air stream. As in the outer chamber, fuel is injected and combustion is maintained by flame holder 1350*b* in the combustion chamber 1307*b*. The heated air stream is then expanded through a fourth set of magnetic flux lines 1321 radiating out of the center magnetic bar 1301 and into the rotating magnetic cylinder 1302 at the outlet of the chamber. The fourth set of magnetic flux lines 1321 have a component in the opposite radial direction as the third set of magnetic flux lines 1311. The expanded air stream is then further expanded through the nozzle 1313.

The rotating magnetic cylinder 1302 rotates at an angular velocity $\Omega$ as illustrated in FIG. 13. The initial rotation of the magnetic cylinder 1302 can be electrically or mechanically initiated similar to the startup of conventional turbojet engines and thus is not discussed further.

Sources of Charged Particles

While not the emphasis of this disclosure, several methods of injecting charged particles or ionizing a gas stream are discussed. The following methods are exemplary only and are not exhaustive.

The electron structure of an atom consists of a number of shells, each containing specified number of electrons. The removal of one of these electrons to create a positive ion requires a quantity of energy called the ionization potential. As might be expected, those atoms containing single electrons in unfilled outer shells are easily ionized (i.e., they have relatively low ionization potentials. The alkali metal elements—lithium, sodium, potassium, rubidium, and cesium—have particularly low ionization potentials). Table I lists first and second ionization potentials (pertaining to the removal of the first and second electrons, respectively) for these elements, along with others for reference purposes. Note the relatively high ionization potentials of the inert elements, reflecting the fact that electrons must be extracted from a stable outer shell which is completely filled. The second electron extracted from an alkali metal must also come from a full shell accounting for the high ratio of second to first ionization potentials of these materials. Mercury, often considered as a propellant because of its high atomic mass and relatively easy handling characteristics, normally contains two electrons in its outermost shell. Hence its first two ionization potentials are relatively close together.

TABLE 1

| Element | Atomic Number | First ionization potential, eV | Second ionization potential, eV |
|---|---|---|---|
| Alkali metals | | | |
| Li | 3 | 5.4 | 75 |
| Na | 11 | 5.1 | 47 |
| K | 19 | 4.3 | 31 |
| Rb | 37 | 4.2 | 27 |
| Cs | 55 | 3.9 | 23 |
| Inert elements | | | |
| He | 2 | 24.5 | 54 |
| Ne | 10 | 21.5 | 41 |
| A | 18 | 15.7 | 28 |
| H | 1 | 13.5 | — |
| C | 6 | 11.2 | 24 |
| Hg | 80 | 10.4 | 19 |

Two ionization processes are of importance for ion rockets: electron-bombardment ionization, occurring as a result of direct collision between an energetic electron and a single propellant atom in the gaseous phase, and contact ionization, occurring as an interaction between a single propellant atom and a suitable solid surface. In the former, low ionization potential favors low charging power, but it is not absolutely essential. In the latter it is essential that the ionization potential be quite low.

As a gas stream (air stream) with a net charge is required for operation of the gas engine described in this disclosure, the creation of the charged gas stream is necessarily important. The charged gas stream can be created by injecting charged particles into the gas stream, the air stream can be ionized and separated; or other known methods can be used.

Charge insertion and ionization is well known in the aerospace field. In a typical ion rocket, neutral propellant is pumped to an ion production chamber from which ions and electrons are withdrawn in separate streams. The exact method of generating and separating ion streams is immaterial. The subject matter of this disclosure needs only the result of these methods.

While embodiments of the present subject matter have been presented as air breathing engines with air as the working gas, such should not be construed as a limitation of the subject matter. Working gases of all types may be employed and various methods of applying heat are equally envisioned. It is only limitations of the basic cycle that limits the selection of the working gas and heating method.

Alternatively, while not discussed explicitly in this disclosure, the magnetic field can be replaced with an electric field and in turn, the ionized or charged particle stream can be substituted with a magnetically charged stream of magnetic charged particles to achieve a similar result. Changes to the described system and method to operate in the aforementioned manner are well within the ability of one skilled in the art given the teachings of this disclosure.

It is also envisioned that the gas engine described herein may utilize a regenerator extracting heat form the engine exhaust, an intercooler which reduces the stagnation temperature of the air stream after compression or a re-heater, such as an afterburner, or a combination thereof. It is also envisioned that the present subject matter may be used in combined cycle power systems.

Figure 14A:
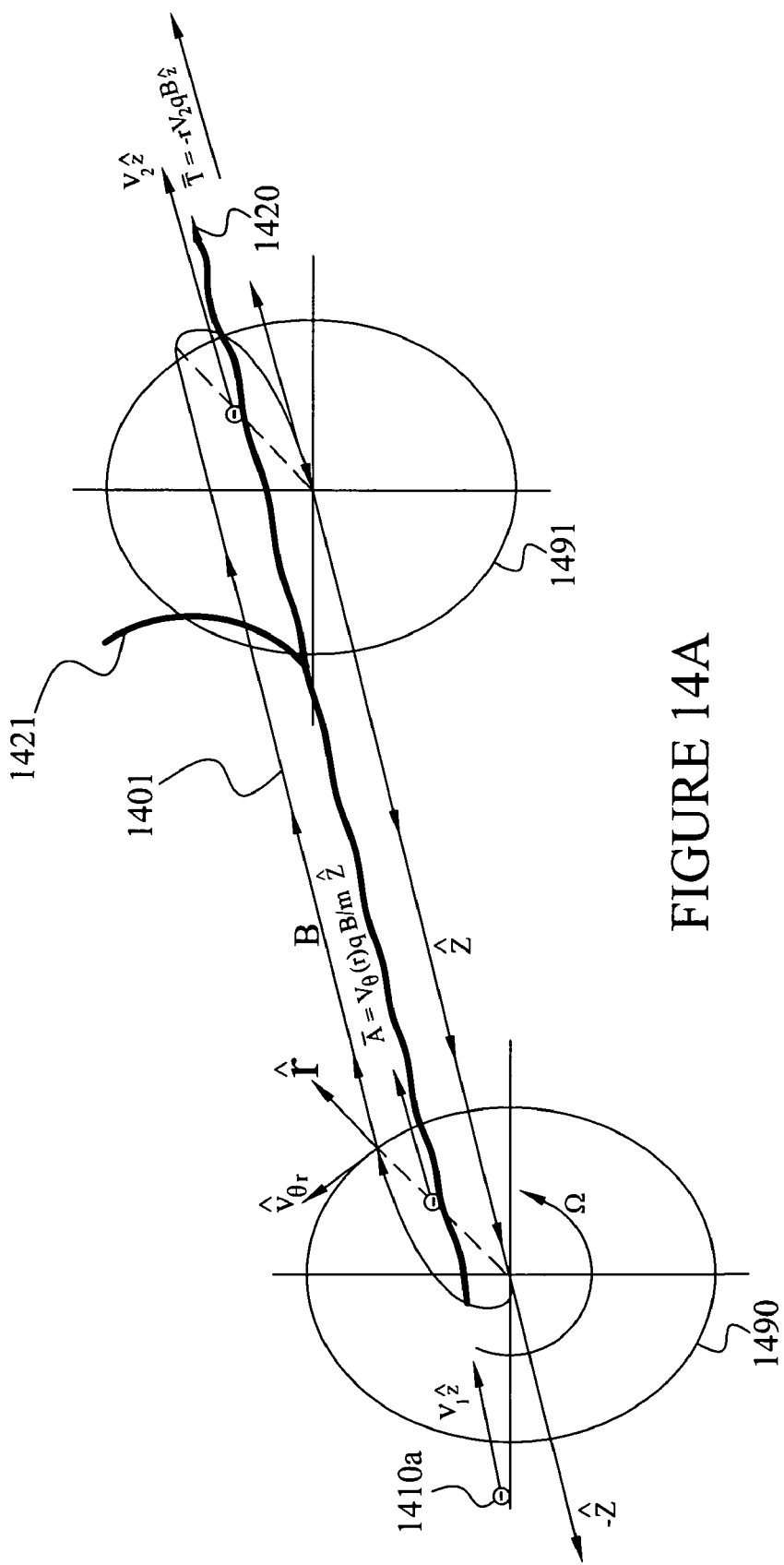
FIG. 14A is a representation of the interaction between the rotating magnetic field and a charged particle in an inertia frame.

FIG. 14A is a more rigorous representation of the interaction between the charged particles and the rotating magnetic field. A single flux line 1401 is shown for clarity. The rotating magnetic field, as described in this disclosure, is comprised of an infinite collection of these conceptual flux lines. The flux line 1401 radiates from the z axis at an opening 1490 then curves back to the periphery of the opening 1490. At the opening 1491 the flux line 1401 curves back around into the z axis at the origin of the opening 1491 thus completing the magnetic circuit. The flux line 1401 rotates around the z axis with an angular velocity of $\Omega$. The local velocity of the flux line 1401 is $\Omega r \hat{\theta}$ and is represented in FIG. 14a as $V_\theta(r)$.

A charged particle 1410a enters the opening 1490 with an approximate velocity of $V_1 \hat{z}$. In this depiction the charge has a negative charge. The magnitude of the charged particle's velocity is preferably less than that of the local velocity of the flux line 1401. In FIG. 14A, the particle velocity is much less than the average local velocity $|\vec{V}_1 \hat{z}| < |\vec{V}_\theta(r)|$. The charged particle 1410a follows the air stream path 1420. The air stream path 1420 is a conceptualized generalized path, the actual path for each particle will of course differ greatly and be more chaotic.

The negatively charged particle, 1410a upon interacting with the flux line 1401 at opening 1490, experiences an acceleration along the z axis. The acceleration, $\vec{A} = (V_\theta(r) B \hat{z} + V_1 B \hat{\theta}) q/m$, can be simplified since $|V_1 \hat{z}| < |\vec{V}_\theta(r)|$ to $\vec{A} = V_\theta(r) q B \hat{z}/m$. As noted above, the collective effect on the air stream because of the increased velocity of the charged particles is an increase in pressure. The air stream and the charged particles therein, as a result of being heated and expanded, experience a significant increase in velocity. The charged particle 1410a, prior to interaction with the flux line 1401 and the opening 1491, has increased its velocity to $V_2 \hat{z}$ where $V_2 \gg V_1$ as a result of the expansion. Due to the increased particle velocity, $V_2 \gg V_\theta(r)$, the particle now experiences an acceleration of:

$$\vec{A} = (-V_\theta(r) B \hat{z} - V_2 B \hat{\theta}) q/m$$

Since $V_2 \gg V_\theta(r)$, the acceleration can be generalized by:

$$\vec{A} = -V_2 q B \hat{\theta}/m.$$

The force exerted on the charged particle to develop the acceleration results in an equal and opposite force on the flux line 1401. This force is generalized as $\vec{F} = V_2 q B \hat{\theta}$ which results in a torque $\vec{T} = \vec{r} \times \vec{F} = -r V_2 q B \hat{z}$ on the flux line 1401 and thus the magnetic device. A similar result occurs if the charged particle 1410a is directed through the flux line 1401 along path 1421. From the perspective of the charged particle, these interactions would be indifferent.

Figure 14B:
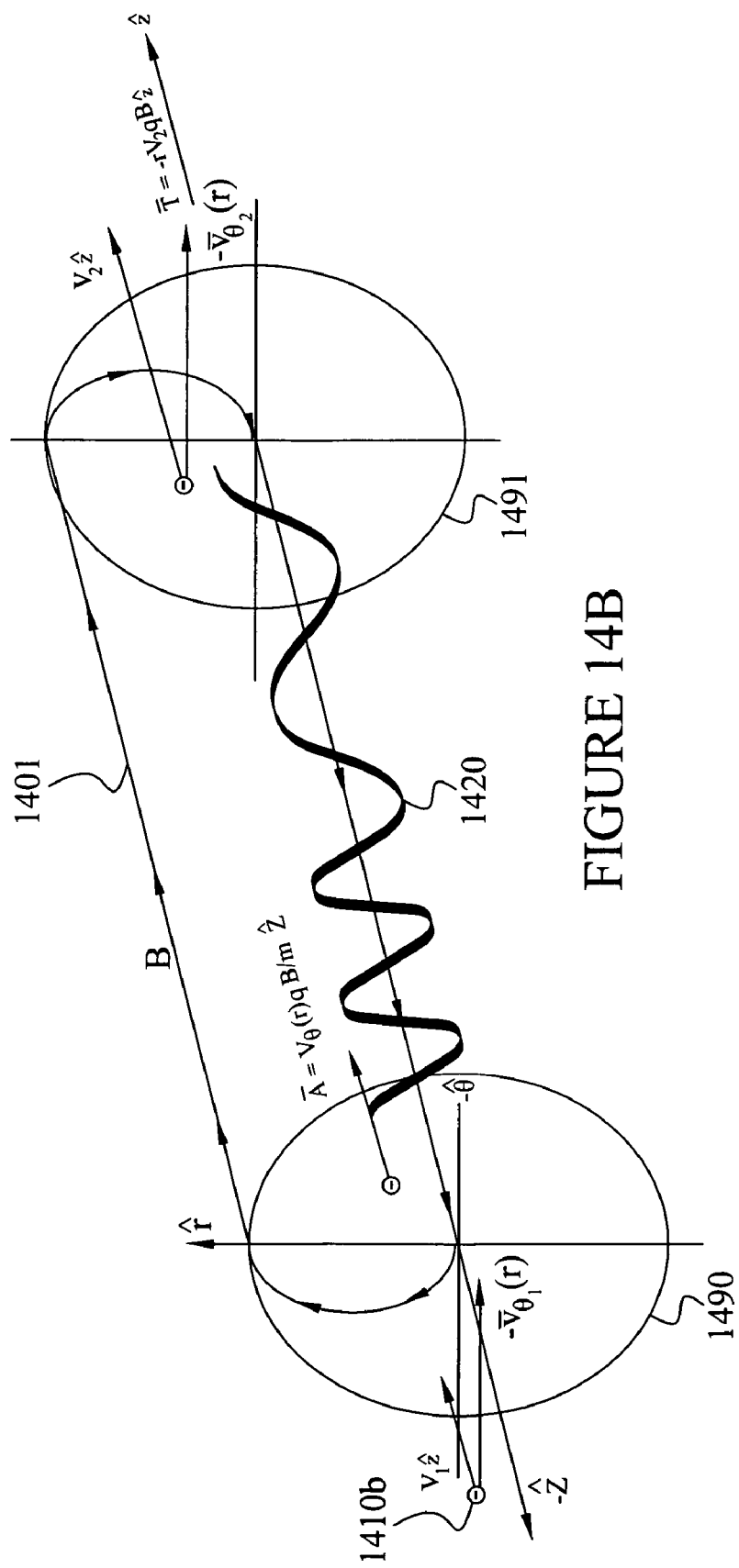
FIG. 14B is a representation of the interaction between the rotating magnetic field and a charged particle in a frame fixed in the magnetic field.

FIG. 14B is a representation of same interaction between the charged particle 1410b and the magnetic flux line 1401 as shown in FIG. 14A but from a frame fixed in the in the magnetic field. The magnetic flux line 1401 remains fixed and its relative rotation is now expressed on the charged particle 1410. The charged particle now, upon entering the opening 1490, has a velocity $\vec{V} = V_1 \hat{z} - V_\theta(r) \hat{\theta}$ where $|V_1 \hat{z}| < |\vec{V}_\theta(r)|$.

The charged particle 1410 upon interacting with the flux line 1401 at opening 1490, experiences an acceleration along with the z axis. The acceleration as above is simplified to $\vec{A}=V_\theta(r)qB\,\hat{z}/m$. The charged particle 1410b prior to interaction with the flux line 1401 and the opening 1491, has increased its velocity to $V_2\hat{z}$ where $V_2 \gg V_1$ and $V_2 \gg V_\theta(r)$ as a result of the expansion. The particle now experiences an acceleration of:

$$\vec{A}=-V_2qB\hat{\theta}/m.$$

The force exerted on the charged particle to develop the acceleration results in an equal and opposite force on the flux line 1401. This force is generalized as $\vec{F}=V_2qB\hat{z}$ which results in a torque $\vec{T}=\vec{r}\times\vec{F}=-rV_2qB\hat{z}$ on the flux line 1401 and thus the magnetic device. From a fixed frame, the path 1420 of the particle looks like an expanding spiral. Again from the perspective of the charged particle, these interactions and paths are generally the same.

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What I claim is:

1. A gas engine comprising:
   a duct having an inlet and an exit;
   a magnetic field device for providing a rotating magnetic field about an axis, said magnetic field defined by a first set of magnetic flux lines proximate to said inlet and a second set of magnetic flux lines proximate to the exit;
   a combustion chamber within said duct and between said inlet and said exist;
   wherein an ionized gas stream having a net charge enters said duct via said inlet through the first set of magnetic flux lines, passes into the combustion chamber and exits said duct through the second set of magnetic flux lines and said exit.

2. The gas engine according to claim 1, wherein said first set of magnetic flux lines has a component anti-parallel with a component of said second set of magnetic flux lines with respect to a velocity of the ionized gas stream proximate the respective sets of magnetic flux lines.

3. The gas engine according to claim 1, wherein said first set of magnetic flux lines having a radial component in one direction normal to the axis proximate to said inlet; and the second set of magnetic flux lines having a radial component anti-parallel to said first set of magnetic flux lines proximate to the exit.

4. The gas engine according to claim 1, further comprising an ionized gas generator.

5. The gas engine according to claim 4, further comprising a charge separator, said charge separator directing gas with a net charge into the duct by separating the ionized gas into positive and negative charged gas ion.

6. The gas engine according to claim 1, wherein the rotation of said first set of magnetic flux lines about said axis is coupled to the rotation of said second set of magnetic flux lines about said axis.

7. The gas engine according to claim 1, wherein said magnetic field device is a rotating magnet.

8. A gas engine comprising:
   an outer duct concentric with an inner duct, the outer duct and the inner duct each comprising an inlet and an exit; the outer duct and inner duct separated by a boundary having a first end proximate to the inlets and a second end proximate to the exists;
   a magnetic field rotating about an axis, said magnetic field defined by:
      a first set of magnetic flux lines having a radial component in one direction normal to the axis and between the boundary and a periphery of the outer duct proximate to the first end,
      a second set of magnetic flux lines having a radial component in the opposite direction normal to the axis and between the boundary and the periphery of the outer duct proximate to the second end,
      a third set of magnetic flux lines having a radial component in the opposite direction normal to the axis and between the boundary and the axis proximate to the first end,
      a fourth set of magnetic flux lines having a radial component in the one direction normal to the axis and between the boundary and the axis proximate to the second end,
   a combustion chamber within said outer chamber and between said first end and said second end;
   wherein a first ionized gas stream having a first net charge enters the outer duct via the outer duct's inlet through the first set of magnetic flux lines, passes into the combustion chamber and exists the outer duct through the second set of magnetic flux lines and the outer duct's exist; and,
   wherein the rotation of the first set of magnetic flux lines about the axis is coupled to the rotation of at least the second set of magnetic flux lines about the axis.

9. The gas engine according to claim 8, comprising a second combustion chamber within said inner duct and between said first end and said second end; and,
   wherein a second ionized air stream having a second net charge opposite the first net charge enters the inner duct through the third set of magnetic flux lines, passes into the second combustion chamber and exists the inner duct through the forth set of magnetic flux lines and the inner duct's exit.

10. The gas engine according to claim 9, comprising a charge separator upstream of the first end wherein said charge separator directs gas with a second net charge to the inner duct's inlet and directs gas with a first net charge into the outer duct's inlet.

11. The gas engine according to claim 8, further comprising a charge separator upstream of the first end, said charge separator directing gas with a first net charge into the outer duct's inlet.

12. The gas engine according to claim 8, further comprising an ionized gas generator.

13. The gas engine according to claim 8, wherein the magnetic field is generated by a rotating magnet.

14. A method for extracting work out of a gas comprising;
   providing a gas stream having a net charge;
   exposing the gas stream to a moving magnetic field defined by a first set of magnetic flux lines having a first velocity vector to accelerate particles in the gas stream in a direction normal to the first set of flux lines and normal to the first velocity vector, thereby compressing the gas stream;
   heating the compressed gas stream;
   expanding the heated gas stream to thereby increase the gas stream's velocity;
   exposing the expanded gas stream to a second magnetic field defined by a second set of magnetic flux lines thereby imparting a force normal to the gas stream velocity and the second set of magnetic flux lines on the second magnetic field; and, extracting the work from the rotation of the second magnetic field.

15. The method of claim 14, wherein the step of providing a gas stream further comprises the step of using a corona to ionize ambient air.

16. The method of claim 14, wherein the step of heating includes the step of providing a fuel and combusting the fuel within the gas stream.

17. The method of claim 14, wherein the first set of magnetic flux lines has a first direction and the second set of magnetic flux lines has a second direction opposite the first direction and the second magnetic field has a velocity equal to said first velocity.

18. The method of claim 14, wherein the first set of magnetic flux lines has a first direction and the second set of magnetic flux lines have the first direction and the second magnetic field has a velocity opposite to said first velocity.

19. The method of claim 14, wherein the step of providing a gas stream further comprises the step of injecting charged particles into the gas stream.

20. A gas engine comprising:

a continuous air stream path;

a magnetic flux compressor comprising a first portion of a moving magnetic field, said first portion having a local velocity with a component perpendicular to the air stream path proximate the magnetic flux compressor;

a combustion chamber downstream of the magnetic flux compressor; and, a magnetic flux turbine downstream of the combustion chamber comprising a second portion of the moving magnetic field having a second local velocity with a component perpendicular to the air stream path proximate the magnetic flux turbine and anti-parallel to the local velocity with respect to the air stream path;

wherein the movement of the first portion and the movement of the second portion of the moving magnetic field are coupled.

* * * * *